US011487675B1

(12) United States Patent
Volpe

(10) Patent No.: US 11,487,675 B1
(45) Date of Patent: Nov. 1, 2022

(54) COLLECTING STATISTICS FOR PERSISTENT MEMORY

(71) Applicant: Amazon Technologies, Inc., Seattle, WA (US)

(72) Inventor: Thomas A. Volpe, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 79 days.

(21) Appl. No.: 16/933,887

(22) Filed: Jul. 20, 2020

Related U.S. Application Data

(63) Continuation of application No. 15/830,973, filed on Dec. 4, 2017, now Pat. No. 10,733,110.

(51) Int. Cl.
*G06F 12/10* (2016.01)
*G06F 12/1027* (2016.01)
*G06F 3/06* (2006.01)

(52) U.S. Cl.
CPC ........ *G06F 12/1027* (2013.01); *G06F 3/0616* (2013.01); *G06F 3/0649* (2013.01); *G06F 3/0656* (2013.01); *G06F 3/0673* (2013.01); *G06F 2212/657* (2013.01); *G06F 2212/68* (2013.01)

(58) Field of Classification Search
CPC .. G06F 3/0616; G06F 3/0649; G06F 12/1027; G06F 3/0679; G06F 12/0246; G06F 3/064; G06F 3/0653; G06F 3/0656; G06F 3/0673; G06F 2212/657; G06F 2212/1036; G06F 2212/7201; G06F 2212/7211; G06F 2212/2022; G06F 2212/68; G06F 3/06
See application file for complete search history.

(56) References Cited

U.S. PATENT DOCUMENTS

| 6,000,006 | A | 12/1999 | Bruce et al. |
|---|---|---|---|
| 8,935,493 | B1 | 1/2015 | Dolan et al. |
| 9,703,664 | B1 | 7/2017 | Alshawabkeh et al. |
| 10,102,117 | B2 * | 10/2018 | Talagala ................ G06F 12/121 |
| 10,733,110 | B1 * | 8/2020 | Volpe .................... G06F 3/0656 |

(Continued)

OTHER PUBLICATIONS

S. Jiang, Lei Zhang, XinHao Yuan, Hao Hu and Yu Chen, "S-FTL: An efficient address translation for flash memory by exploiting spatial locality," 2011 IEEE 27th Symposium on Mass Storage Systems and Technologies (MSST), 2011, pp. 1-12.*

(Continued)

*Primary Examiner* — Pierre Michel Bataille
(74) *Attorney, Agent, or Firm* — Weaver Austin Villeneuve & Sampson LLP

(57) ABSTRACT

Disclosed herein are techniques for management of a non-volatile memory device. In one example, an integrated circuit comprises a cache device and a management controller. The cache device is configured to store a first mapping between logical addresses and physical addresses of a first memory, the first mapping being a subset of mapping between logical addresses and physical addresses of the first memory stored in a second memory, and an access count associated with each of the physical addresses of the first mapping. The management controller is configured to: maintain access statistics of the first memory based on the access counts stored in the cache device; and determine the mapping between logical addresses and physical addresses stored in the second memory based on the access statistics and predicted likelihoods of at least some of the logical addresses receiving an access operation.

18 Claims, 13 Drawing Sheets

(56) References Cited

U.S. PATENT DOCUMENTS

| | | | |
|---|---|---|---|
| 2004/0139282 A1 | 7/2004 | Yoshioka et al. | |
| 2013/0013654 A1 | 1/2013 | Lacapra et al. | |
| 2013/0080688 A1* | 3/2013 | Park | G06F 3/061 |
| | | | 711/E12.008 |
| 2013/0326148 A1 | 12/2013 | Fang et al. | |
| 2014/0281260 A1* | 9/2014 | Peterson | G06F 3/0679 |
| | | | 711/135 |
| 2015/0193302 A1* | 7/2015 | Hyun | G11C 29/028 |
| | | | 714/764 |
| 2017/0131947 A1* | 5/2017 | Hoang | G06F 11/3034 |
| 2017/0300423 A1 | 10/2017 | Kamruzzaman | |
| 2017/0371559 A1 | 12/2017 | Higgins et al. | |
| 2018/0004650 A1 | 1/2018 | Battaje et al. | |
| 2021/0034512 A1* | 2/2021 | Shin | G06F 3/0653 |

OTHER PUBLICATIONS

K. Han, H. Kim and D. Shin, "WAL-SSD: Address Remapping-Based Write-Ahead-Logging Solid-State Disks," in IEEE Transactions on Computers, vol. 69, No. 2, pp. 260-273, Feb. 1, 2020.*

C. Wang and W. Wong, "ADAPT: Efficient workload-sensitive flash management based on adaptation, prediction and aggregation," 2012 IEEE 28th Symposium on Mass Storage Systems and Technologies (MSST), 2012, pp. 1-12.*

S. Lee, H. Bahn and S. H. Noh, "CLOCK-DWF: A Write-History-Aware p. Replacement Algorithm for Hybrid PCM and DRAM Memory Architectures," in IEEE Transactions on Computers, vol. 63, No. 9, pp. 2187-2200, Sep. 2014.*

U.S. Appl. No. 15/830,973, "Advisory Action", dated Feb. 27, 2020, 5 pages.

U.S. Appl. No. 15/830,973, "Final Office Action", dated Sep. 17, 2019, 28 pages.

U.S. Appl. No. 15/830,973, "Non-Final Office Action", dated Feb. 13, 2019, 26 pages.

U.S. Appl. No. 15/830,973, "Notice of Allowance", dated Apr. 1, 2020, 9 pages.

Wang et al., "PCFTL: A Plane-Centric Flash Translation Layer Utilizing Copy-Back Operations", IEEE Transactions on Parallel and Distributed Systems, vol. 26, No. 12, Dec. 1, 2015, pp. 3420-3432.

* cited by examiner

COLLECTING STATISTICS FOR PERSISTENT MEMORY

CROSS REFERENCE TO RELATED APPLICATIONS

This application is a Continuation of and claims priority to U.S. application Ser. No. 15/830,973, filed Dec. 4, 2017, issued as U.S. Pat. No. 10,733,110 on Aug. 4, 2020, and titled "COLLECTING STATISTICS FOR PERSISTENT MEMORY," the contents of which are herein incorporated in its entirety.

BACKGROUND

Many organizations provide computing services over a plurality of communication networks. The computing services may include, for example, network-based services such as storage or virtual servers that can be provided over the Internet to different clients. A system that provides these network-based services (e.g., a server network) may need to access a huge volume of data (e.g., user data, system data, etc.) associated with the provision of these services. It may be desirable to provide the system with fast and reliable data storages with high storage capacity, to facilitate the provision of these network-based services.

BRIEF DESCRIPTION OF THE DRAWINGS

Various embodiments in accordance with the present disclosure will be described with reference to the drawings, in which.

DETAILED DESCRIPTION

Figure 1:
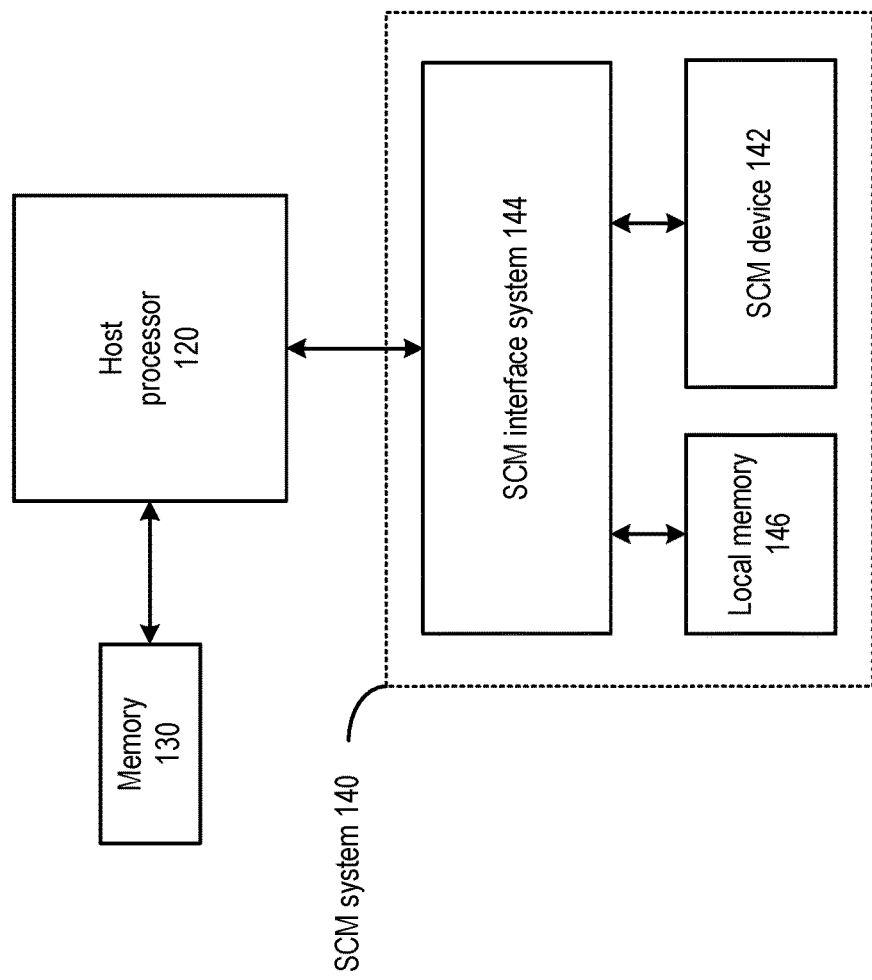
FIG. 1 is a simplified block diagram of an example server in a compute service system, according to certain aspects of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, wellknown features may be omitted or simplified in order not to obscure the embodiments being described.

Embodiments of the present disclosure relate to managing access to non-volatile (or persistent) storage class memory (SCM) device. An integrated circuit may include a cache device (e.g., a translation look-aside buffer (TLB)) that stores mappings between logical addresses and physical addresses associated with the SCM device. The cache device also stores an access count (e.g., a write count, a read count, etc.) for each of the physical addresses stored in the cache device. The access count can be used to accumulate a level of wear at different SCM blocks of the SCM device. Based on the level of wear information, certain wear-leveling operations can be performed on the SCM device to extend the lifespan of the SCM device.

A compute service system may include a plurality of servers that can host data and be used by multiple clients or organizations to run instances, such as virtual machine instances, which access server hardware via a hypervisor, or bare-metal instances which run directly on the server hardware. In most cases, instances, such as bare-metal or virtual machine instances, in a multi-tenant compute service system may be allocated to a client when the client needs them and decommissioned when they are no longer needed, such that the resources can be reallocated to other clients. In the present disclosure, the terms "tenant," "client," and "customer" may be used interchangeably. These terms do not necessarily require the presence of a commercial relationship. The term "instance" may refer to, for example, an instance that is executed directly on server hardware or as a virtual machine. Different types of instances generally provide different hardware functions or arrangements.

To support the execution of the instances, the compute service system needs a data storage system that can store a huge volume of data (e.g., system data, user data, etc.) related to the execution of the instances and can provide fast access to the stored data. As a trade-off between capacity and access speed, a hierarchy of data storage devices associated with different capacities and access speeds can be provided to store the data. The hierarchy of data storage devices may include, for example, a static random access (SRAM) cache device, a dynamic random access memory (DRAM) device, and a storage device. The SRAM and DRAM devices typically provide non-persistent data storages (e.g., the stored data will be erased when power supply to those devices are off) and have very limited capacity, but can provide relatively fast access to the stored data. On the other hand, a storage device (e.g., flash-based solid-state drive (SSD), magnetic drive, etc.) can provide persistent and high capacity data storages, but the access speed of storage device is typically slow compared with SRAM and DRAM devices. Data that needs to be accessed immediately (e.g., instructions and data associated with an application currently running in the compute service system, etc.) can be stored in the SRAM cache device and/or the DRAM device, whereas the storage device can be used to provide bulk data storage for data that needs not be accessed immediately. For example, the storage device can be used to store backup data, or data files related to other applications that are not currently running in the compute service system. When running an application, the compute service system can identify data that needs to be accessed by the application. The compute service can then move the identified data from the storage device into the DRAM device, and from the DRAM device into the SRAM cache device, to provide the identified data to the application.

Although a hierarchy of data storage devices comprising a SRAM cache device, a DRAM device, and a storage device can provide reasonable performance, the performance can be constrained by a huge discrepancy in the access speeds between the DRAM/SRAM devices and the storage device. For example, due to the slow access speed of the storage device, there can be a huge delay in moving the data from the storage device to the DRAM/SRAM devices, which delays the execution of the application and degrades the performance of the compute service system.

To improve the performance of a hierarchical data storage system, storage class memory (SCM) devices can be used in place of a storage device, or as a buffer device between the DRAM device and the storage device. Storage class memory devices can include, for example, resistive random-access memory (RRAM) devices, phase change memory (PCM), magnetoresistive RAM (MRAM), ferroelectric RAM (FeRam), etc., that can provide persistent storage for data. SCM devices can also provide higher access speed (compared with storage devices). For example, some SCM devices can include RRAM devices that provide superior access speed compared with, for example, magnetic disks, and certain flash-based NAND devices. Moreover, the SCM devices can be organized as dual in-line memory modules (DIMM), in the same form as DRAM DIMMs. The SCM DIMMs can also be connected to the board through similar high speed interfaces designed for DRAM DIMMs (with separate memory controllers for the SCM DIMMs and the DRAM DIMMs), which improves the data transfer speed of SCM DIMMs. Furthermore, the SCMs can be designed to allow access at a cacheline granularity (e.g., 64 Byte), rather than a block or page size granularity (e.g., 4 KB) that is typical for storage devices.

The persistent storage and high access speed of SCM devices can add new functionalities and applications to a data storage system. For example, the SCM devices can operate as an auxiliary DRAM device to provide additional byte-addressable storage (as opposed to block addressable storage of typically 4 KB provided by storage devices) for different applications. For example, in a case where the hypervisor detects that a virtual machine instance is inactive, the hypervisor can move the operation data associated with that instance from the DRAM device into an SCM device that operates as a temporary cache, to free up DRAM resources for other active virtual machine instances. When the hypervisor detects that the virtual machine instance becomes active again, the hypervisor can move the operation data of that virtual machine instance back into the DRAM device. As another example, the SCM device can store a copy of the data stored in the DRAM device, and can act as a non-volatile memory (NVM) backup. In a case where the data is lost in the DRAM device due to power failure or power off, the data stored in the DRAM can be restored back based on the copy of the data stored in the SCM device, when the power is back on. The SCM device can also be used as part of a memory-mapped file scheme (e.g., mmap, Linux Direct Access (DAX), etc.), in which certain SCM blocks of the SCM device are mapped to a file stored in the storage device, and an application can access the file by performing memory operations (e.g., a write operation, a read operation, etc.) to the mapped SCM blocks of the SCM devices.

Moreover, the SCM devices may also operate as an auxiliary (or alternative) high speed storage device to provide block-addressable storage. For example, instead of loading block data from a conventional storage device, the DRAM device can load the block data from the SCM devices (e.g., directly via direct memory access (DMA)) to accelerate access to the block data. With these new functionalities and applications, a more reliable and efficient data storage system can be provided.

Although SCM devices provide substantial performance improvement (e.g., access speed) compared with conventional storage devices, SCM devices have limited write endurance, which affects the reliability of the SCM devices. The write endurance sets a limit of a total number of write operations a unit of the SCM device (e.g., a page) may receive before the SCM unit degrades and introduces errors in the stored data.

The limited write endurance of SCM devices can pose severe limitation on the operation of the data storage system. For example, in a case where the SCM devices operate as a back-up for the DRAM device, the data stored in the SCM devices may need to be constantly and frequently updated to track the data stored in the DRAM device. Moreover, in a case where the SCM devices operate as a cache device to hold operation data for inactive instances, the data stored in the SCM devices are also constantly and frequently updated, as new virtual machine instances are created and shut down in the compute service system for different clients. Therefore, the SCM devices may receive a large number of write operations. If those write operations are concentrated at a subset of the SCM devices, the write endurance limit may be reached, and the subset of the SCM devices may be damaged. Data stored on those SCM devices may be lost as well.

Embodiments of the present disclosure relate to managing access to a non-volatile storage class memory (SCM) device. An integrated circuit may include a cache device (e.g., a translation look-aside buffer (TLB)) that stores mappings between logical addresses and physical addresses associated with the SCM device. The logical addresses may represent an address space accessed and/or managed by various software applications (e.g., an operating system) being executed on a computer. To enable the computer (and the applications) to access the SCM devices using a logical address, an address translation process can be provided to convert the logical address to a physical address associated with the SCM devices, and the mappings information stored in the TLB can be used to facilitate the address translation process.

In addition to the mappings, the cache device also stores an access count (e.g., a write count, a read count, etc.) for each of the physical addresses stored in the cache device. The access count can be used to accumulate statistics for different SCM blocks of the SCM device to provide an access history for the SCM blocks. The write count is incremented whenever the cache device receives a translation request to translate a logical address to a physical address (based on the stored mapping), and the translation request is associated with a write operation to the SCM devices. The read count is incremented whenever the cache device receives a translation request to translate a logical address to a physical address (based on the stored mapping), and the translation request is associated with a read operation to the SCM devices.

The access counts in the cache entries can be transferred to and temporarily stored at a statistics log when, for example, the access count in an entry overflows, or that entry is evicted. The statistics log can be accessed by an SCM management controller, which can obtain the access count for an SCM block and update an accumulative access count for the SCM block based on the access count. The accumulative access count information can be used for wear-leveling operations. Moreover, the statistics log can also be stored as another data structure (separate from the data structure for accumulative write counts) in the SCM device, so that the access count information stored in the statistics log remain available for the updating of the accumulative access count in the event of power loss, which enables the wear-leveling operation to become more robust.

As discussed above, the access count information can be used by an SCM management controller to generate access history for the SCM blocks. The access history, in turn, can be used to implement different wear-leveling operations at the SCM device, to improve the reliability of the SCM devices. For example, the SCM management controller can obtain the write counts information from the cache device, and generate (or update) accumulative write counts for different SCM blocks of the SCM devices based on the write counts information from the cache device. The SCM management controller can rank the physical addresses of the SCM devices (e.g., in the form of SCM block numbers) based on the associated accumulative write counts, and update the mappings between the logical addresses and the physical addresses based on a result of the ranking. With the updated mapping, the SCM management controller can direct the write operations to different SCM blocks within the SCM devices, to more evenly distribute the write operations among the SCM blocks of the SCM devices. Further, the SCM management controller can also manage, based on the accumulative write counts information, migration of data from a first set of SCM block of the SCM device associated with excessive accumulative write counts to a second set of SCM blocks of the SCM device associated with lower accumulative write counts, as part of the pre-determined wear-leveling policy. The accumulative write counts, and the mapping between the accumulative write counts and the SCM blocks, can also be stored in a data structure in the SCM devices, such that the accumulative write counts information can be stored persistently, and the information can remain stored when power is off. All these can reduce the likelihood of exposing a particular SCM block (or a particular set of SCM blocks) within the SCM devices to excessive write operations, to improve the reliability of the SCM devices.

Moreover, maintaining the write counts at the cache device can also improve the efficiency of the SCM management controller. For example, the SCM management controller can obtain the write count from the statistics log at a time when the SCM management controller is idle, and update the accumulative write counts based on the write count information from the statistics log, instead of updating the accumulative access counts after every single access operation of the SCM device. Given that the updating of the accumulative write counts (and wear-leveling operation) is typically not time-sensitive, such arrangements can free up resources at the SCM management controller to perform other tasks that are more time-sensitive. As a result, the performance of the SCM management controller, as well as the performance of the data storage system as a whole, can be improved.

Further, storing the statistics log as well as the accumulative access counts at a persistent memory device, such as an SCM device, can provide other advantages. For example, the statistics log and accumulative access counts data can be retrieved at a later time to support the wear-leveling operation. This can provide the flexibility in scheduling when to perform the wear-leveling operation, to minimize the disruption to other operations of the server. Moreover, given that the size of the statistics log data can be very large, storing the log data in an SCM device instead of in a volatile memory (e.g., a DRAM device, an SRAM device, etc.) can free up valuable volatile memory resources to support other operations of the server. All these can improve the performance of the server.

FIG. 1 is a simplified block diagram of an example server 100 in a compute service system, according to certain aspects of the present disclosure. Many components or modules of server 100 are omitted in FIG. 1 in order not to obscure the features being described herein. One skilled in the relevant art will appreciate that the disclosed illustrative components are not meant to be an exhaustive identification of all the components required by or present in a server. Rather, illustrative components have been identified, in a non-limiting manner, to facilitate illustration of one or more aspects of the present disclosure. Still further, the illustrative components of server 100 may be logical in nature such that the physical implementation of one or more components can be varied or such that one or more of the logical components may be implemented in a virtualized manner. Additionally, one or more servers 100 may share one or more of the illustrated or unillustrated components, such as processors, graphical processing units, memory, storage, and the like.

In an illustrative embodiment, server 100 may be associated with various hardware components, software components, and respective configurations that facilitate the execution of client applications. In some implementations, server 100 may provide a multi-tenant platform to multiple clients through multiple adapter devices. In some embodiments, server 100 may be dedicated to a client at a given time, while no other client may have access to server 100 at the same time.

Server 100 may include a host processor 120, which may include, for example, one or more x86 processor cores, or other circuits capable of executing machine-readable instructions. Host processor 120 can execute software instructions to, for example, host virtual machine instances for different clients, regulate access (e.g., by implementing a hypervisor) by the virtual machine instances to the various hardware resources of server 100, etc. In some embodiments, host processor 120 may also include GPUs. Host processor 120 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in host processor 120 may include processors developed by ARM®, MIPS®, AMD®, Intel®, Qualcomm®, and the like. In certain implementations, host processor 120 may include multiple processors or processing cores, wherein each processing core may be configured to execute instructions independent of other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores, or processing threads executing on the same core may share certain resources, such as, for example, busses, level 1 (L1) caches, and/or level 2 (L2) caches. The instructions executed by processor(s) 120 may be stored on a computer-readable storage medium, for example, in the form of a computer program.

Server 100 also includes a memory 130. Memory 130 may be part of a hierarchical data storage system comprising the level 1 (L1) caches, and/or level 2 (L2) caches of processor(s) 120, memory 130, and SCM system 140. In some embodiments, memory 130 may include volatile memory device including, for example, a random access memory (RAM), dynamic random access memory (DRAM), or a synchronous dynamic random-access memory (SDRAM), such as double data rate (DDR), DDR2, DDR3, or DDR4 SDRAM. In some embodiments, the memory module may also include several levels of cache hierarchy, such as Level 1 (L1) caches, Level 2 (L2) caches, Level 3 (L3), or last level caches. Although FIG. 1 illustrates memory 130 as a single device, it is understood that memory 130 may include two or more memory devices, each of which can be, for example, a DDR DIMM, and can be connected to a first set of DIMM sockets on a motherboard of server 100 (not shown in FIG. 1). The first set of DIMM sockets can be electrically coupled with host processor 120 via a set of high speed memory buses. Memory 130 may store data and instructions obtained from SCM system 140 to be executed by host processor(s) 120. Memory 130 may also include read-only-memory (ROM) devices to store executable code, often referred to as firmware, which can be executed by processor(s) 120 to cause components of server 100 to initialize and identify system devices such as the video display card, keyboard and mouse, hard disk drive, optical disc drive, and other hardware.

Server 100 also includes SCM system 140, which can be part of the hierarchical data storage, as described above. SCM system 140 may be dedicated to host processor 120 and may include one or more SCM devices 142, an SCM interface system 144, and a local memory 146. SCM device 142 can be used to provide storage for data and instructions to be used by host processor 120. As discussed above, SCM device 142 can act as an auxiliary DRAM device to, for example, provide backup for the DRAM devices of memory 130, to store operation data for inactive virtual machine instances, etc. SCM device 142 can also be used as a storage device to provide bulk data storage. SCM device 142 may include, for example, SCM DIMMs including flash-based NAND devices, RRAM devices, etc., and can be connected to a second set of DIMM sockets on the motherboard of server 100. The second set of DIMM sockets can be electrically coupled with SCM interface system 144, also via a set of high speed memory buses.

SCM interface system 144 can include a FPGA, an ASIC, an SOC, or other circuitries, and can provide an interface between processor 120 (and memory 130) and SCM device 142. For example, SCM interface system 144 is electrically coupled with SCM device 142 (e.g., via DIMM sockets and memory buses), as described above. SCM interface system 144 may include interface circuitries (e.g., receivers, transmitters, signal-conditioning circuits, associated controllers, etc.) for transmitting or receiving pre-determined sequence of signals (e.g., representing physical addresses and data) to the SCM devices to access the SCM devices. Further, SCM interface system 144 is also electrically coupled with host processor 120 via a set of high speed buses including, for example, Peripheral Component Interconnect Express (PCIe) buses, Intel® Ultrapath Interconnect (UPI) buses, etc. SCM interface system 144 may also include interface circuits (e.g., receivers, transmitters, signal-conditioning circuits, associated controllers, etc.) to interface with the PCIe and UPI buses. Moreover, SCM interface system 144 may also establish a communication channel with host processor 120 via those buses. For example, SCM interface system 144 may be part of single-root I/O virtualization (SR-IOV), and may include a virtual function (VF) to directly communicate with a virtual machine instance hosted by host processor 120.

SCM interface system 144 can also manage accesses to SCM device 142. For example, SCM interface system 144 may maintain a mapping between a set of logical addresses and a set of physical addresses. The set of logical addresses can be virtual addresses managed by, for example, operating systems operating on host processor 120. The set of physical addresses can be associated with one or more regions of SCM device 142. When SCM interface system 144 receives a request to access SCM device 142 accompanied by a logical address, SCM interface system 144 can translate the logical address into a physical address of the SCM device 142 based on the mapping, and transmit signals carrying the physical address to SCM device 142 to perform a write operation or a read operation at a region of SCM device 142. As to be discussed in more details below, SCM interface system 144 can control the allocation of resources for performing address translation for a virtual machine instance, to provide a pre-determined quality of service (QoS), in terms of setting a speed of performing the address translation and processing the access request, for that virtual machine instance.

SCM interface system 144 can process access requests to SCM device 142 from different sources. For example, SCM interface system 144 may receive access requests from host processor 120 via the aforementioned high speed buses (e.g., PCIe, UPI, etc.). SCM interface system 144 can also process access requests from, for example, a memory management unit (MMU) of server 100 (not shown) as part of a direct memory access (DMA) scheme. The MMU may accept an access request including a logical address provided by, e.g., a virtual machine instance (operated by a guest user), the hypervisor, etc., operating on host processor 120, and forward the access request together with the local address to SCM interface system 144. SCM interface system 144 can then process the access request, and transmit the requested data (e.g., for a read operation), as well as a status of processing the access request, back to the requestor.

SCM interface system 144 can also perform various operations to improve the integrity of data stored at the SCM devices. For example, SCM interface system 144 can maintain a data structure including accumulative write counts for at least some of the SCM blocks in the SCM device 142, to maintain a history of write operations at SCM device 142. The data structure can include a mapping between the accumulative write counts and the physical addresses (e.g., in the form of SCM block numbers). SCM interface system 144 can also implement a pre-determined wear-leveling policy for SCM device 142 based on the accumulative write counts information. For example, as to be described in more details below, SCM interface system 144 can update the mapping between the logical addresses and physical addresses to direct the write operations to SCM blocks of the SCM device 142 associated with lower accumulative counts. With such arrangements, the write operations can be more evenly distributed among different SCM blocks of the SCM device 142, which can extend the life time of the SCM device.

Further, SCM interface system 144 can also perform other wear-leveling operations, as well as error-handling operations, to further improve the reliability of SCM device 142 and to reduce likelihood of data errors at the SCM device. For example, SCM interface system 144 may perform migration of hot data (e.g., data that are accessed relatively frequently or recently) and cold data (e.g., data that are not accessed as frequently or recently as hot data) between SCM blocks of SCM device 142 based on the accumulative write counts. SCM interface system 144 may copy or move hot data to SCM blocks associated with relatively lower accumulative write counts, to reduce the likelihood of introducing errors in the hot data by the potentially defective SCM devices. Moreover, SCM interface system 144 may copy or move cold data to SCM blocks associated with relatively higher accumulative write counts, so that more lightly-worn SCM blocks can become available for the hot data. In addition, SCM interface system 144 can also perform various error correction/detection schemes to further reduce the likelihood of data error. For example, SCM interface system 144 can generate and store error correction codes (ECC) based on the stored data. For example, SCM interface system 144 may employ Reed-Solomon (RS) algorithm to generate error correction symbols based on pre-determined chunks (e.g., 64 bytes) of stored data, and store the error correction symbols with the chunks of data. SCM interface system 144 may also perform a data scrubber process, in which the system can perform periodical verification of the stored data and correct any data error based on the error correction symbols stored in SCM device 142.

Referring back to FIG. 1, SCM system 140 further includes local memory 146. Local memory 146 may include volatile memory devices (e.g., DDR) and non-volatile memory devices (e.g., ROM) to store various data to support the operations of SCM interface system 144. For example, local memory 146 may store the mapping information between logical addresses and physical addresses, which can be retrieved by SCM interface system 144 to perform address translation for processing the access requests to SCM device 142 (from host processor 120, DMA engines, etc.). As another example, local memory 146 can provide temporary storage for migration of data within SCM device 142. Moreover, local memory 146 can also store other configuration information. For example, in a case where SCM interface system 144 is implemented on an FPGA, local memory 146 may also store netlist information for configuring the FPGA to implement the aforementioned functionalities of SCM interface system 144.

Although FIG. 1 illustrates that server 100 includes a single host processor 120 and a single SCM system 140, it is understood that server 100 may include multiple host processors 120 and multiple SCM systems 140. For example, server 100 may include two host processors 120, with each host processor 120 electrically coupled with a dedicated SCM system 140 via a set of high speed buses. As another example, server 100 may also include a single host processor 120 electrically coupled with multiple SCM systems 140.

Figure 2:
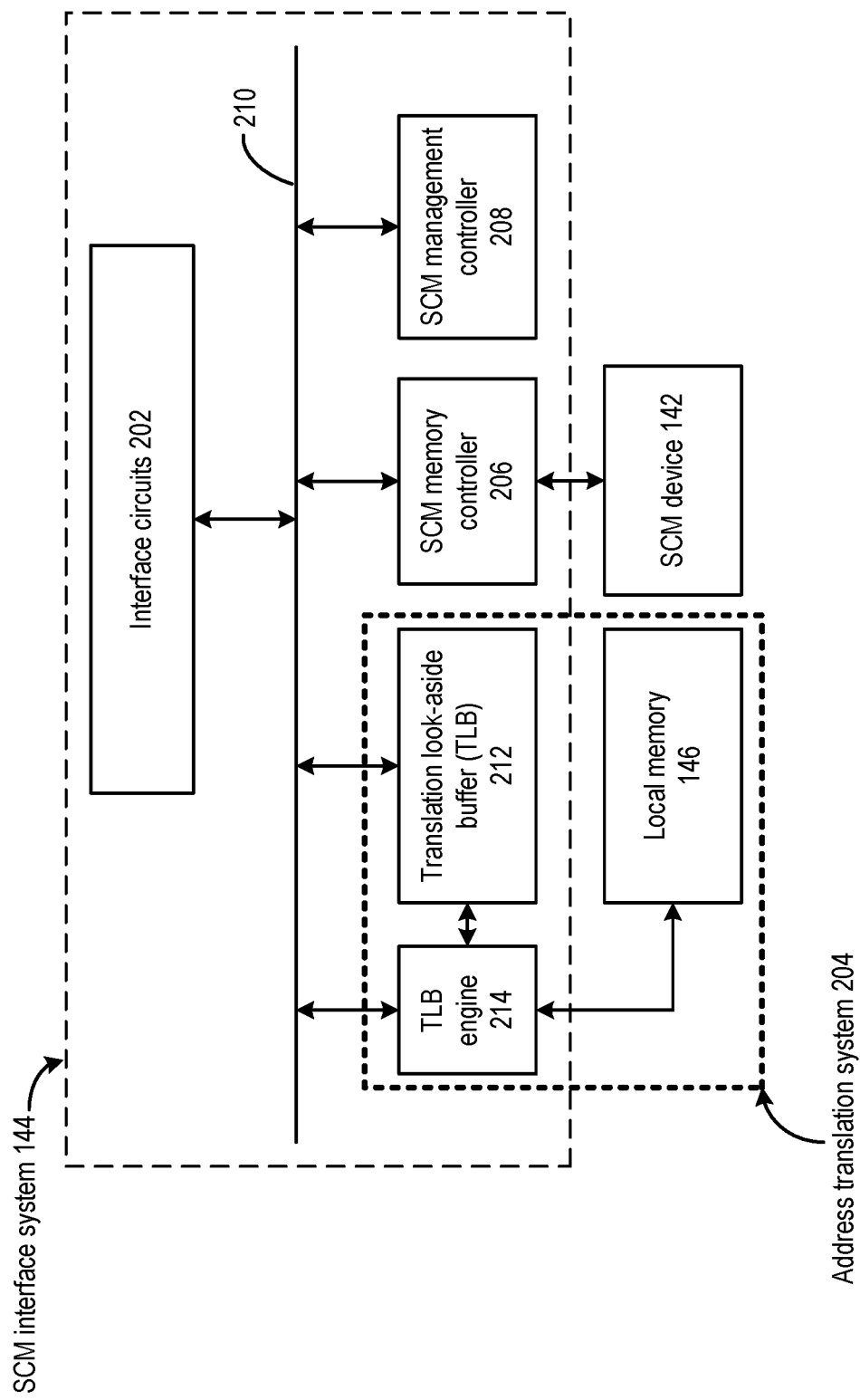
FIG. 2 is a simplified block diagram of example subcomponents of the example server of FIG. 1, according to certain aspects of the present disclosure.

Reference is now made to FIG. 2, which illustrates examples of some of the internal components of SCM interface system 144 of FIG. 1 according to certain aspects of the present disclosure. As shown in FIG. 2, SCM interface system 144 may include host interface circuits 202, an address translation system 204, an SCM memory controller 206, and an SCM management controller 208. These components of SCM interface system 144 may be electrically coupled with an interconnect fabric 210. In some embodiments, interconnect fabric 210 can be based on, for example, the Advanced Extensible Interface (AXI) interface. The access requests to SCM device 142 can include AXI read requests and AXI write requests. Based on whether an access request is an AXI read request or an AXI write request, SCM interface system 144 can determine whether the access request includes a write operation or a read operation at SCM device 142.

Interface circuits 202 may include circuits for receiving access requests to SCM device 142, and for transmitting requested data (e.g., for a read operation). For example, input interface circuits 202 may include high speed bus interface circuits for interfacing with the high speed buses (e.g., PCIe, UPI, etc.) connecting between host processor 120 and SCM interface system 144. Interface circuits 202 may also include circuits that interface with an external MMU to receive access requests and to transmit requested data through DMA. Interface circuits 202 may also include other circuitries for performing randomized scrambling of logical addresses associated with the access requests to improve security, as discussed above.

Address translation system 204 provides the translation between the logical addresses (managed by host processor 120) and the physical addresses (associated with SCM device 142) for an access request to SCM device 142. Moreover, SCM memory controller 206 provides a hardware interface to SCM device 142 for performing write and read operations to SCM device 142 based on physical addresses received from address translation system 204. SCM memory controller 206 can also perform the write and read operations (or can decline to perform the operations) to implement various management operations including, for example, wear-leveling management. SCM management controller 208 interfaces with the hypervisor and manages the state of SCM device 142. SCM management controller 208 may maintain a history of write operations (in the form of accumulative write counts) for different SCM blocks within SCM device 142. SCM management controller 208 can perform a pre-determined wear-leveling policy based on the accumulative write counts including, for example, updating the address mapping information to steer (via SCM memory controller 206) write operations to different SCM blocks, initiating data migration (e.g., in response to a write failure, in response to one or more SCM blocks within SCM device 142 approaching the write endurance limit, etc.) at SCM memory controller 206, etc.

As shown in FIG. 2, address translation system 204 may include a hierarchical data storage for storing the mapping information between the logical addresses and the physical addresses. The hierarchical data storage for storing the mapping information may include a translation look-aside buffer (TLB) 212 configured as a cache device, and local memory 146 (of SCM system 140 in FIG. 1). Local memory 146 (e.g., a DRAM device) can store a mapping between a logical address space (e.g., for a particular virtual machine instance, for the hypervisor, etc.) and to the physical addresses (e.g., in the format of SCM block numbers). Local memory 146 may be accessible by SCM memory controller 206, SCM management controller 208, and TLB 212 via another memory controller (not shown in FIG. 2). In some embodiments, the logical address space may correspond to the entire local address space managed by host processor 120 (or at least for a particular virtual machine instance), to reduce the likelihood of a page fault where address translation system 204 is unable to provide a translated physical address for a logical address due to gaps in the mapping. With such arrangement, SCM device 142 can provide host processor 120 a guarantee of access (based on full logical address space mapping) similar to that of a storage device, with an access speed similar to that of DRAM. By providing host processor 120 access to a robust storage system, the performance of server 100 can be improved.

TLB 212 can be configured as a cache device to store a subset of local addresses and the mapped physical addresses from local memory 146, to provide fast access to the subset of physical addresses. The subset of logical addresses may include, for example, a logical address associated with a recent prior access request, and a set of logical addresses adjacent to that logical address. Due to temporal and spatial locality, the subset of logical addresses are more likely to be associated with subsequent access requests to be processed by SCM interface system 144 and need translation to physical addresses. Therefore, to speed up the processing of the subsequent access requests, the subset of logical addresses and the mapped physical addresses can be stored in TLB 212. When SCM interface system 144 receives an access request and translates the logical address associated with the access request to a physical address, SCM interface system 144 can first refer to the mapping information in TLB 212 and, if the mapping information is missing, another subset of logical addresses (and the mapped physical addresses) can be acquired from local memory 146 and stored into TLB 212. In addition, address translation system 204 further includes a TLB engine 214 to manage various operations at TLB 212, such as retrieving the physical addresses from TLB 212 to perform the address translation, managing the storage of the logical and physical addresses in TLB 212 (e.g., by fetching mapping information from local memory 146) as well as other configuration, etc., the details of which are to be described below.

Figure 3A:
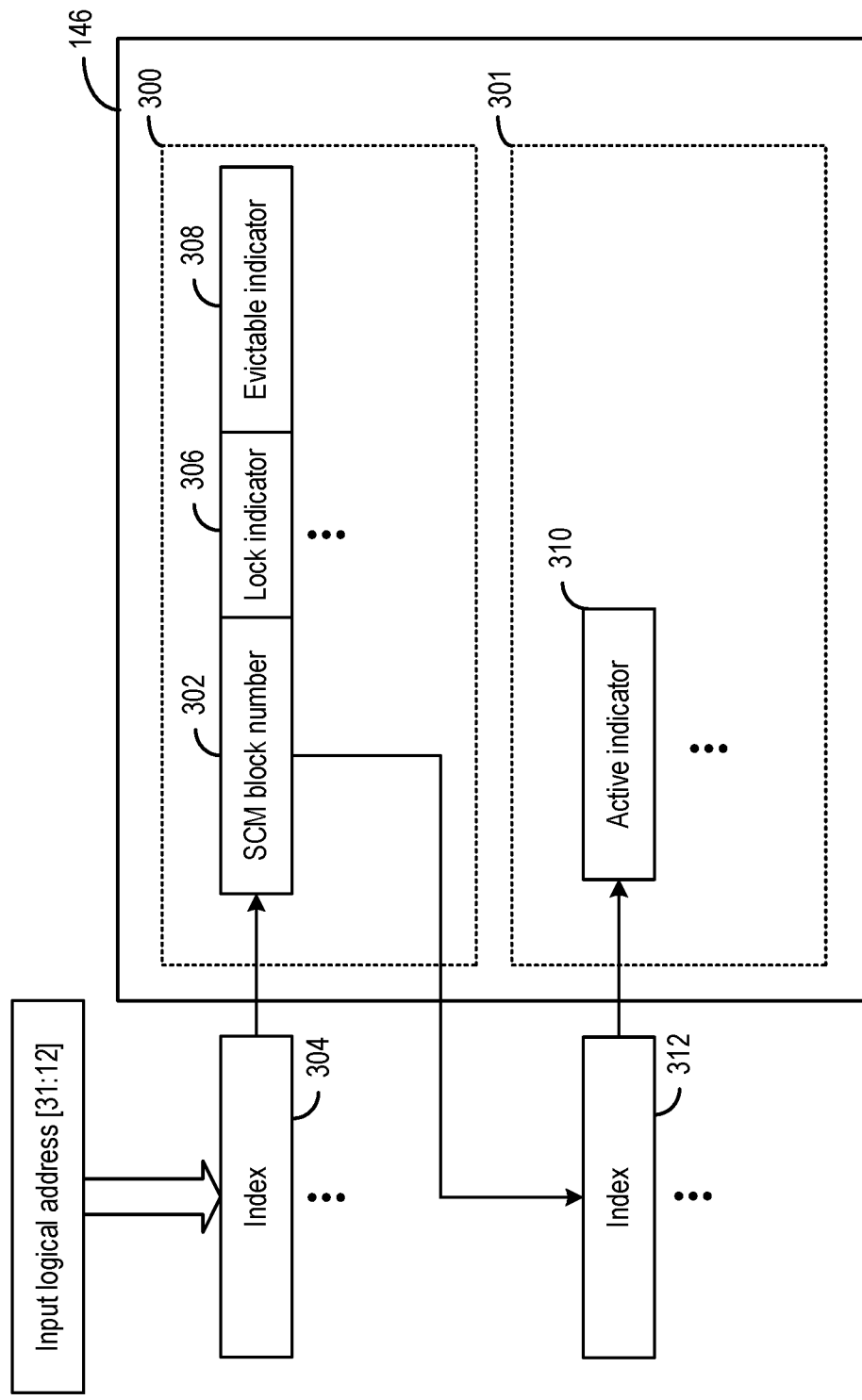
FIG. 3A and FIG. 3B illustrate examples of an address mapping provided by sub-components of the example server of FIG. 1, according to certain aspects of the present disclosure.

Reference is now made to FIG. 3A, which illustrates examples of the mapping information stored in local memory 146 for address translation, according to certain aspects of the present disclosure. The mapping information can be used to translate a logical address associated with an access request to SCM device 142 received from host processor 120 (e.g., for a virtual machine instance, for the hypervisor, etc.). The mapping information can also be used to process an access request from SCM memory controller 206 for a data migration operation between different regions of SCM device 142.

As shown in FIG. 3A, local memory 146 (e.g., a DRAM device) may include a first memory region 300 and a second memory region 301. Memory region 300 may store a page table comprising a set of SCM block numbers 302, each representing a physical address of SCM device 142 to be mapped to a logical address. An SCM block number may be associated with an SCM block, which may include a plurality of pages. Each page can be the minimum addressable unit by a logical address. In the example of FIG. 3A, an SCM block can include 4 kilobytes of data, and a page may include 8 bytes of data. An SCM block can include 512 consecutive pages (4096/8), and an SCM block number can be mapped to 512 logical addresses associated with those 512 consecutive pages. The 512 logical addresses may have common most significant bits. For example, in a case where the logical addresses have 32 bits, the most significant 20 bits (bit 12 to bit 31) of the 512 logical addresses may be identical, whereas bits 3-11 (for indexing one of the 512 pages) and bits 0-2 (for indexing one of the eight bytes of a page) may have different values for different logical addresses.

To represent the mapping between SCM block number 302 and the logical addresses, SCM block number 302 can be indexed, within memory region 300, by an index 304 derived from the logical addresses. Index 304 can be set to be equal to the common set of MSB bits shared by the logical addresses. For example, in the example of FIG. 3A, index 304 can be set based on the most significant 20 bits (bit 12 to bit 31) of the set of logical addresses mapped to SCM block number 302.

In addition to SCM block numbers, the page table in memory region 300 can also store other configuration information that can influence the handling of the address mapping information by TLB 212 when the information is stored in the TLB. For example, as shown in FIG. 3A, memory region 300 may store a lock indicator 306 and an evictable indicator 308. Both lock indicator 306 and evictable indicator 308 are associated with the logical address (and indexed by index 304) and can indicate certain policies for processing of the logical address. For example, lock indicator 306, when asserted, can indicate that the logical address (and the mapped SCM block number), once loaded into TLB 212, is to remain in TLB 212 and not to be evicted to make way for other logical address mapping (in the case where TLB 212 is full), so that the translation of that logical address (and the associated access request) can proceed more quickly. Moreover, evictable indicator 308, when asserted, can indicate that the logical address (and the mapped SCM block number) can be evicted from TLB 212 if TLB 212 is full. Both lock indicator 306 and evictable indicator 308 can be provided by a virtual machine instance (e.g., as part of the access request including the logical address) to indicate a priority of handling the translation of the logical address as well as the associated access request. For example, in a case where the access request associated with a logical address is of lower priority, the virtual machine instance may de-assert lock indicator 306 and assert evictable indicator 308 for that logical address, to indicate that the mapping between the local address and the SCM block number, once stored in TLB 212, can be evicted from TLB 212.

In addition, memory region 301 may also store an active indicator 310. Active indicator 310 may indicate whether an SCM block contains valid data, and can be asserted whenever a write operation is performed on the SCM block. Active indicator 310 may also be provided by a virtual machine instance as part of an access request, to signal whether the accessed SCM blocks are to be freed up. For example, if the access request is associated with an erase operation, active indicator 310 associated with the access request can be de-asserted to indicate that the accessed SCM blocks are not in active use. As to be discussed in more details below, active indicator 310 can influence how SCM interface system 144 handles data migration within SCM device 142. Active indicator 310 may be set by components of SCM interface system 144 that detects and/or performs a write operation including, for example, TLB engine 214 (e.g., when updating write count) and SCM memory controller 206 (e.g., after performing a successful write operation). Active indicator 310 may be indexed by an index 312 derived from SCM block number 302.

The address mapping information (e.g., index 304 and SCM block number 302), as well as configuration information (e.g., lock indicator 306, evictable indicator 308, and active indicator 310), can be managed by SCM management controller 208. For example, when server 100 is at a power-up stage, SCM management controller 208 may receive (e.g., from the hypervisor) a set of logical addresses representing a set of logical regions to be accessed by host processor 120 (e.g., for the virtual machine instances, the hypervisor, etc.). SCM management controller 208 can determine an initial address mapping between the set of logical addresses and the SCM blocks, and store the initial address mapping in local memory 146 in the form described in FIG. 3A. SCM management controller 208 can also initialize the configuration information by, for example, de-asserting lock indicator 306, evictable indicator 308, and active indicator 310.

Figure 3B:
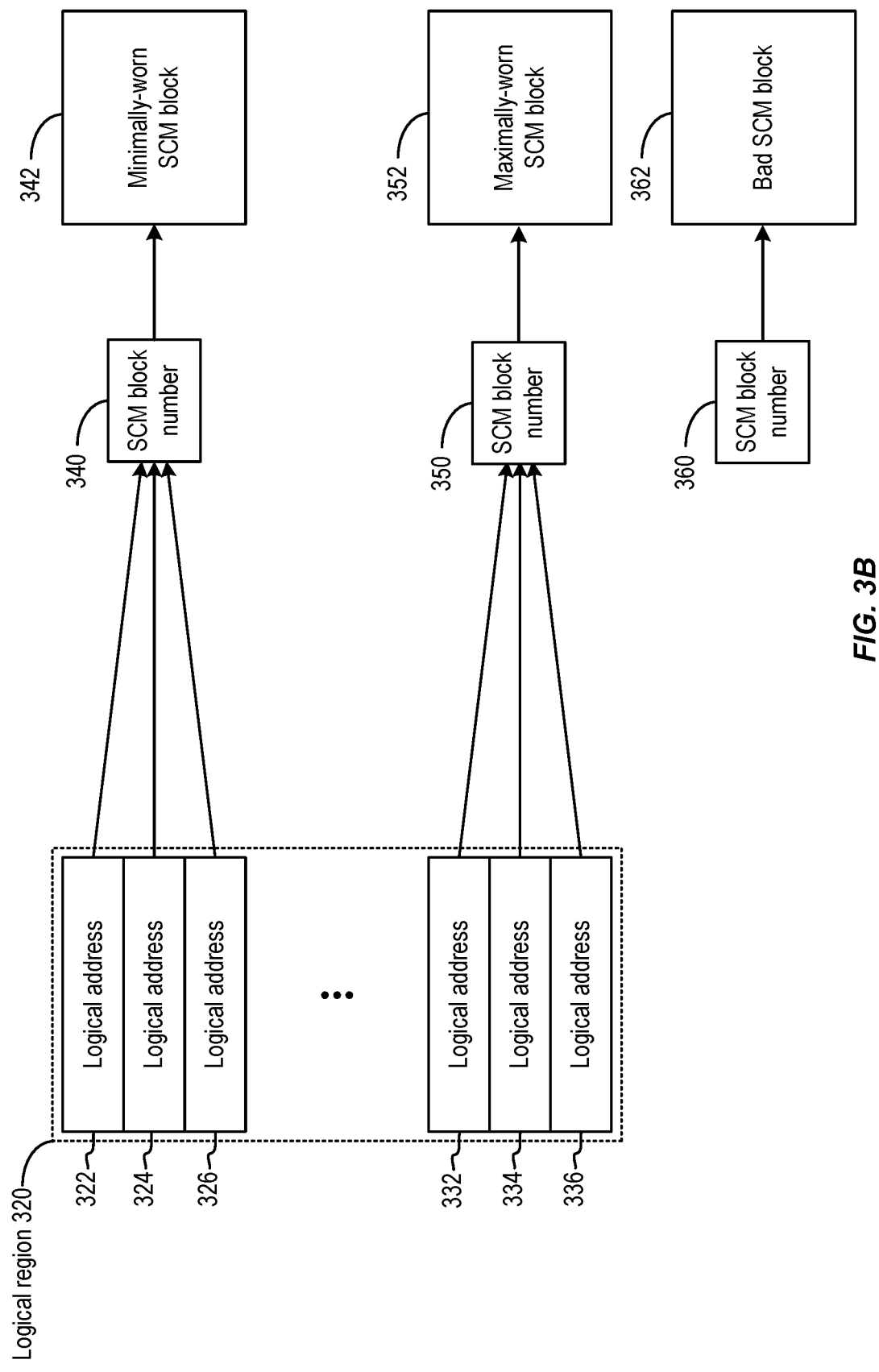

The initial address mapping can be determined by SCM management controller 208 based on the wear conditions of the SCM blocks. Reference is now made to FIG. 3B, which illustrates an example of the mapping of logical addresses to SCM block numbers based on the wear conditions. As shown in FIG. 3B, a logical region 320 can be defined by a logical address range corresponding to a set of consecutive 8-byte pages. Logical addresses 322, 324, and 326 are at the beginning of the logical address range, whereas logical addresses 332, 334, and 336 are at the end of the logical address range. Further, SCM management controller 208 can determine, based on certain operation statistics for the SCM blocks, a set of SCM blocks that can be mapped to logical region 320 (and made accessible to host processor 120), and a set of bad SCM blocks that are not to be mapped to logical region 320 (and hence made inaccessible to host processor 120). For example, SCM management controller 208 may determine that SCM blocks that have accumulated a threshold number of write operations beyond the write endurance limit and/or have exhibited write failures can be isolated and are not to be mapped to logical region 320. Among the set of SCM blocks that are to be mapped to logical region 320, SCM management controller 208 may further rank the set of SCM blocks and map the logical addresses of logical region 320 to the SCM blocks based on the result of ranking, to implement a pre-determined wear-leveling policy. As to be discussed in more details below, SCM management controller 208 can maintain a history of write operations, in the form of accumulative write counts, for some SCM blocks, at the SCM device 142. SCM management controller 208 can also determine, based on the accumulative write counts, the ranking as well as the SCM blocks to be isolated.

FIG. 3B illustrates an example of the initial address mapping determined by SCM management controller 208, according to certain aspects of the present disclosure. For example, logical addresses 322, 324, and 326 are mapped to SCM block number 340, which is associated with a minimally-worn SCM block 342 determined based on the ranking. Further, logical addresses 332, 334, and 336 are mapped to SCM block number 350, which is associated with a maximally-worn SCM block 352 determined based on the ranking. Such an arrangement can be based on an assumption that an application (e.g., an operating system) typically allocates logical addresses for memory operation in a sequential fashion and starts with the logical addresses at the beginning of a logical region. Therefore, in the example of FIG. 3B, it may be expected that logical addresses 322, 324, and 326 (at the beginning of logical region 320) are more likely to receive write operations than, for example logical address 332, 334, and 336 (at the end of logical region 320). To perform wear-leveling, SCM management controller 208 may direct more write operations to more lightly-worn (or minimally-worn) SCM blocks by mapping logical addresses 322, 324, and 326 to SCM block number 340 (associated with a minimally-worn SCM block 342), and by mapping logical address 332, 334, and 336 to SCM block number 350 (associated with maximally-worn SCM block 352). On the other hand, SCM block 360, which is associated with a bad SCM block 362, is not mapped to logical region 320, to mitigate the risk of write failures.

Figure 4:
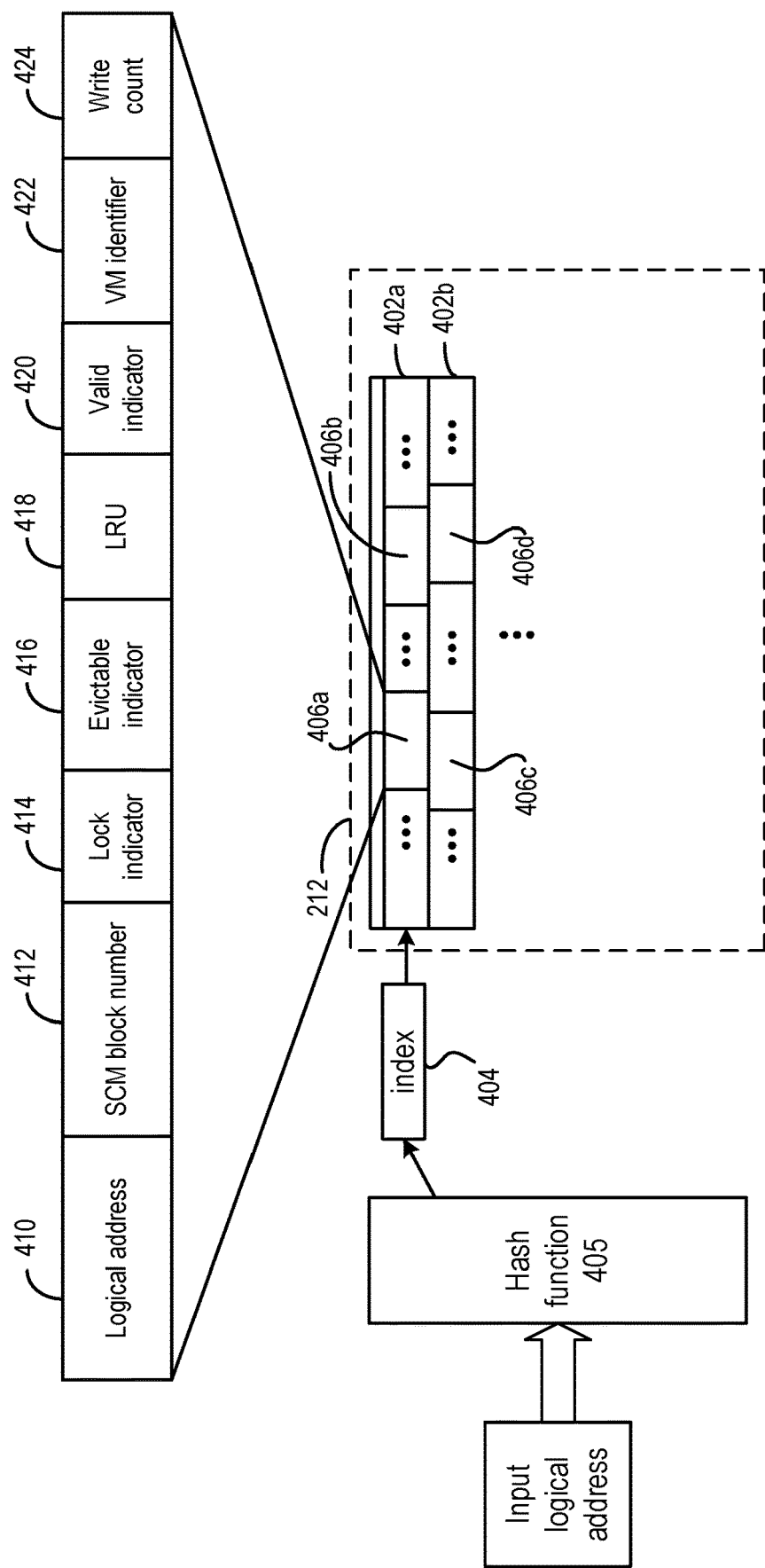
FIG. 4 is a simplified block diagram of example subcomponents of the example server of FIG. 1, according to certain aspects of the present disclosure.

Reference is now made to FIG. 4, which illustrates an example structure of TLB 212 according to certain aspects of the present disclosure. As shown in FIG. 4, TLB 212 includes a plurality of entries 402a, 402b, etc. Each entry can be associated with an index. For example, entry 402 can be associated with an index 404. Each entry also includes a plurality of buckets. For example, entry 402a may include buckets 406a, 406b, etc. Entry 402b may include buckets 406c, 406d, etc. Each bucket, including bucket 406a, may store a logical address 410 and an SCM block number 412 to create a mapping. As to be discussed in more details below, both logical address 410 and SCM block number 412 are obtained based on the address mapping information stored in local memory 146.

Each entry of TLB 212 can be associated with an index, which can be used by TLB engine 214 to search for an entry and a bucket within TLB 212 to obtain an SCM block number for address translation. In the example of FIG. 4, index 404 can be associated with entry 402a. The logical address stored in each bucket of an entry (e.g., entry 402a) can be mapped to the index associated with the entry (e.g., index 404) through a hash function 405. A hash function can be employed to enable mapping of a set of logical addresses to a set of entries (which is much smaller than the set of logical addresses) in TLB 212. The hash function can also be employed to randomize the distribution of the logical addresses among the smaller set of entries of TLB 212.

To perform an address translation for an input logical address (received as part of an access request), TLB engine 214 can apply hash function 405 on the input logical address to obtain an index (e.g., index 404). Based on the index, TLB engine 214 can determine that the buckets of the entry associated with the index (e.g., entry 402a for index 404) may store the SCM block number mapped to the input logical address. TLB engine 214 can then identify all of the buckets of the entry, and compare the logical address stored in each of the buckets with the input logical address, to find a matching bucket. If a matching bucket is found, which corresponds to a TLB hit, TLB engine 214 can provide the SCM block number stored in the matching bucket as an output of the address translation.

On the other hand, if no matching bucket is found, which corresponds to a TLB miss, TLB engine 214 can fetch an SCM block number indexed by the input logical address from local memory 146. For example, as discussed above, the upper 20 bits of the input logical address can be used to derive index 304, and index 304 can be used to retrieve address mapping information, including the SCM block number (e.g., SCM block number 302), that can be fetched from memory 146. TLB engine 214 can also determine an entry index by applying hash function 405 on the input logical address, and store a new address mapping including the fetched SCM block number, and the logical address, in a bucket of an entry associated with the entry index. TLB engine 214 may also evict a bucket of the entry to make room for the new address mapping, if the entry is fully occupied (e.g., every bucket of the entry stores valid data).

TLB engine 214 can then provide the SCM block number mapped to the input logical address as an output of the address translation.

In addition to logical address 410 and SCM block number 412, bucket 406a also stores lock indicator 414, evictable indicator 416, LRU 418, and valid indicator 420. This information is used by TLB engine 214 for eviction determination. For example, valid indicator 420, if asserted, indicates that bucket 406a stores valid data. In the case of TLB miss, TLB engine 214 can determine that an entry is fully occupied based on whether the valid indicator for each bucket of the entry is asserted, and that a bucket is to be evicted to make room for new address mapping information fetched from local memory 146. Moreover, TLB engine 214 can determine which bucket to evict based on lock indicator 414, evictable indicator 416, and LRU 418. Lock indicator 414 and evictable indicator 416 can be obtained from, respectively, lock indicator 306 and evictable indicator 308. As discussed above, lock indicator 306 (as reflected by lock indicator 414) and evictable indicator 308 (as reflected by evictable indicator 416) can be provided to indicate an eviction policy for the bucket. For example, in a case where lock indicator 414 is de-asserted and evictable indicator 416 is asserted in a bucket, the combination of the lock indicator 414 and evictable indicator 416 may indicate that the bucket can be a candidate bucket for eviction if the entry containing the bucket is full and a TLB miss occurs at that entry. Further, LRU 418 can provide an indication of how recently bucket 406a is accessed to provide SCM block number 412 an output of the address translation. TLB engine 214 can determine to evict a bucket that is the least recently used (e.g., among a set of candidate buckets determined based on lock indicator and evictable indicator) based on a pre-determined eviction policy. In some embodiments, LRU 418 can include a counter which is continuously incremented until bucket 406a is accessed to provide SCM block number 412 for address translation. A bucket with the largest LRU counter value may be determined as the least recently used bucket, and may be selected for eviction.

In addition, bucket 406a also stores a virtual machine identifier (VMID) 422 and a write count 424, both of which are associated with logical address 410 and SCM block number 412 of the same bucket. VMID 422 can be a unique identifier assigned by the hypervisor to identify a virtual machine instance. A virtual machine instance can be assigned a VMID during the life time of the instance (e.g., from the time the instance was created to the time the instance was shut down), and can be included as part of the access request (e.g., AXI read request, AXI write request, etc.) generated by the virtual machine instance and transmitted by host processor 120. SCM interface system 144 may also receive the VMID from host processor 120 through a communication channel established via SR-IOV. Write count 424 for a logical address can include a counter that is incremented whenever TLB 212 receives a write request, and the logical address is provided as an input logical address for translation to an SCM block number.

VMID 422 can be used for management of SCM resources including, for example, resource allocation. For example, based on a resource allocation policy, SCM interface system 144 may allocate a pre-determined number of entries in TLB 212 for every virtual machine instance hosted by host processor 120, to prevent any one of the virtual machine instances from using all of the entries in TLB 212. The number of entries allocated for each virtual machine instance can also be based on a quality of service (QoS) subscription associated with those virtual machine instances.

For example, a larger number of entries in TLB 212 can be allocated to a virtual machine instance to provide better QoS, based on the assumption that the allocation of larger number of entries in TLB 212 improves the TLB hit rate and speeds up the processing of access requests to SCM device 142. Further, to improve the utilization of TLB resources, entries associated with virtual machine instances that have become inactive, or have been shut down, can be evicted from TLB 212, to avoid evicting the entries associated with other active virtual machine instances in the event that TLB 212 becomes full and entries need to be evicted to store new address mappings.

TLB engine 214 can enforce the aforementioned resource allocation policy based on VMID. For example, TLB 212 may include entries (e.g., public entries) that are shared among all active virtual machine instances, and entries (e.g., private entries) that are dedicated to certain virtual machine instances. For an access request, TLB engine 214 can obtain the address mapping information for the access request, and determine the VMID associated with the access request. TLB engine 214 can store the address mapping information in an appropriate entry in TLB 212 (e.g., in the private entries dedicated to the virtual machine instance) based on the VMID. TLB engine 214 can also keep a count of a number of buckets used by different virtual machine instances (based on the VMID stored in the buckets) in the public entries, and can evict a bucket used by a virtual machine instance from the public entries if the count for that virtual machine instance in the public entries exceeds a threshold. Further, TLB engine 214 may also evict a bucket associated with a virtual machine instance (based on the VMID stored in the bucket) after determining that the virtual machine instance has become inactive or has shut down.

Moreover, write count 424 can be used for the aforementioned wear-leveling management operations. As discussed above, SCM devices have limited write endurance, which sets a limit of a total number of write operations an SCM page may handle before the SCM page becomes unreliable. To mitigate the risk of excessive writes to the SCM devices, SCM management controller 208 may maintain accumulative write counts for different SCM blocks within SCM device 142. For example, SCM management controller 208 can generate an accumulative write count by accumulating write count 424 for an SCM block. The SCM block can be identified based on the associated SCM block number 412 being mapped to write count 424 in bucket 406a. SCM management controller 208 can also generate accumulative write counts for other SCM blocks based on the write count information stored in TLB 212. SCM management controller 208 can perform one or more wear-leveling operations based on the accumulative write counts to, for example, distribute the write operations among the different SCM blocks within SCM device 142 in a more even fashion.

Figure 5:
FIG. 5 is a simplified block diagram of an example of a statistic log maintained by sub-components of the example server of FIG. 1, according to certain aspects of the present disclosure.

Reference is now made to FIG. 5, which illustrates an example of data structure 500 maintained by SCM management controller 208, according to certain aspects of the present disclosure. Data structure 500 can include, for every SCM block that has received a write operation, an accumulative write count, an indication of whether a write failure has occurred with the SCM block, and a number of correctable data errors of the SCM block. As to be discussed in more detail below, the accumulative write count information can be generated based on the write count information associated with SCM block numbers and VMIDs received from TLB 212, whereas the write failure and correctable data error information can be received from SCM memory controller 206. Data structure 500 can be stored as a persistent data in SCM device 142. For example, the maintenance of accumulative write counts for different SCM blocks of SCM device 142 can start at the time when SCM device 142 is installed and becomes operational at server 100, and ends at the time when SCM device 142 is swapped out and replaced by another SCM device, in which case a new data structure 500 can be initialized for that SCM device.

As discussed above, SCM memory controller 206 and SCM management controller 208 may perform wear-leveling management based on the information stored in data structure 500. For example, from data structure 500, SCM management controller 208 may determine, based on the write failure information, that an SCM block associated with an SCM block number 2 is a bad block (despite the block being associated with a relatively low accumulative write count), and that SCM block number 2 is not to be mapped to the logical addresses. SCM management controller may also determine an SCM block as a bad block based on other criteria, such as the accumulative write count exceeding a write endurance limit, a number of correctable data errors exceeding a pre-determined threshold, etc. In this example, SCM management controller 208 may determine that SCM block number 3 is a bad block based on, for example, the number of correctable data errors (200) exceeding the pre-determined threshold despite no write failure has been reported. SCM management controller 208 may also determine a level of wear based on the accumulative write count for each SCM block based on the accumulative write count, with a larger accumulative write count indicating a higher level of wear and vice versa, and rank the SCM blocks based on the accumulative write counts. SCM management controller 208 can then determine the mapping between the SCM blocks and the logical addresses based on a wear-level policy, such as the one described in FIG. 3B.

In addition, based on statistics log 600, SCM management controller 208 may also initiate a data migration between different SCM blocks within SCM device 142 as part of a wear-level policy. For example, based on the accumulative write count for SCM block number 3 exceeding a threshold, SCM management controller 208 may determine that SCM block number 3 is heavily worn due to the relatively large number of write operations, and that error may be introduced to the data stored in the SCM block. SCM management controller 208 may identify a target SCM block that is relatively lightly-worn compared with SCM block number 3 (e.g., SCM block number 1), and determine, based on active indicator 310, whether the target SCM block contains valid data. If active indicator 310 indicates that target SCM block does not contain valid data (e.g., the target SCM block has never received a write operation, the data stored in the target SCM block has been marked for deletion, etc.), SCM management controller 208 may instruct SCM memory controller 206 to copy data stored in SCM block number 3 to the target SCM block. On the other hand, if active indicator 310 indicates that target SCM block contains valid data, SCM management controller 208 may copy the data at the target SCM block to another SCM block before copying over the data stored in SCM block number 3. SCM management controller 208 may also determine in which SCM block(s) to store and to migrate data structure 500 based on the accumulative write count information as part of the wear-leveling operation, and control SCM memory controller 206 to move and/or copy data representing data structure 500 within SCM device 142 as part of the wear-leveling operation.

Figure 6:
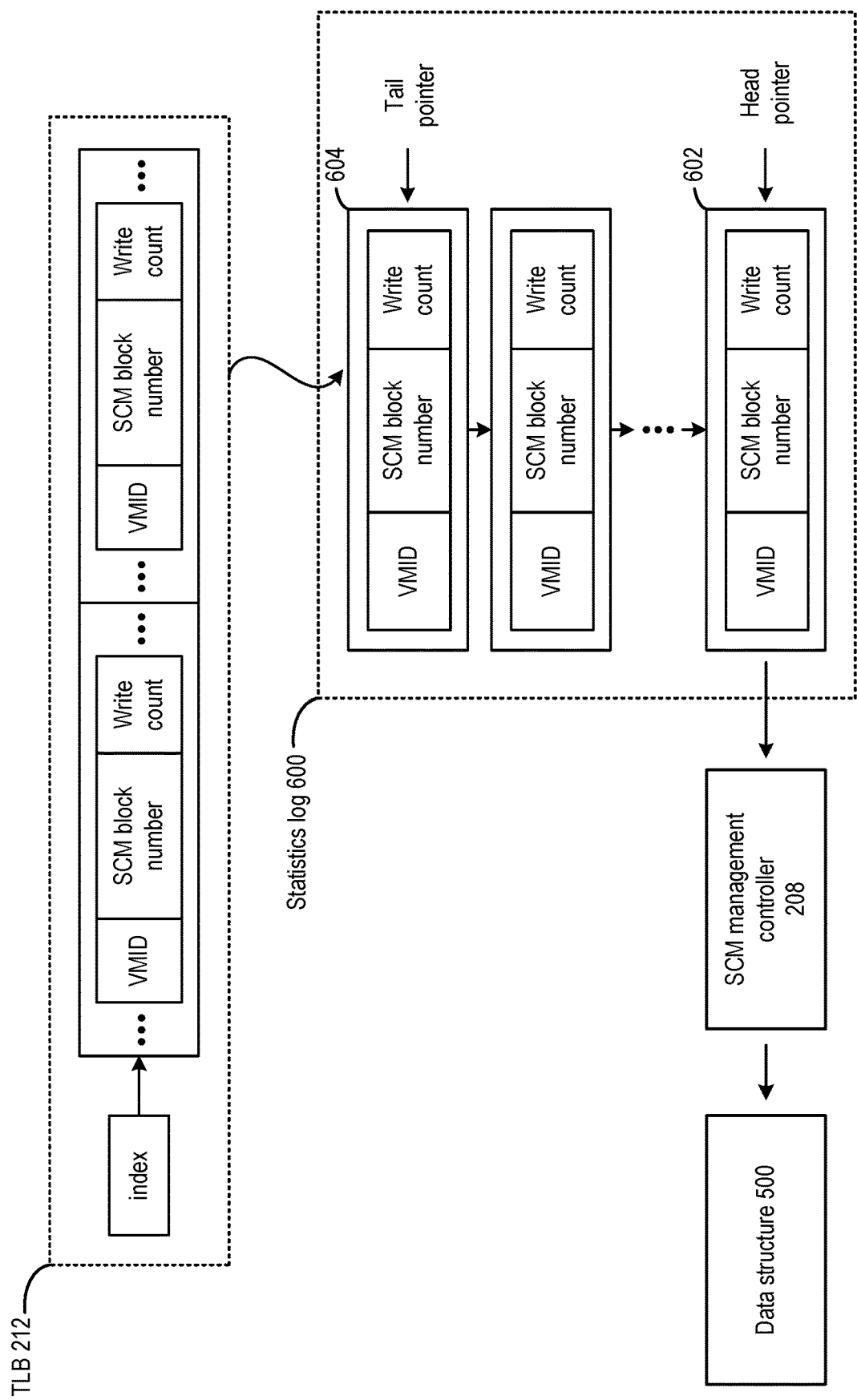
FIG. 6 is a simplified block diagram of an example datapath for updating the statistic log of FIG. 5, according to certain aspects of the present disclosure.

FIG. 6 illustrates an example of a data path for updating data structure 500, according to certain aspects of the present disclosure. As discussed above, TLB 212 stores a write count (e.g., write count 424) associated with a logical address. The write count can be incremented whenever TLB 212 receives a write request, and the logical address is provided as an input logical address for translation to an SCM block number with the write request. The write count may track a number of write access requests associated with that logical address within a certain time period (e.g., when the logical address is stored in a bucket within TLB 212). TLB engine 214 can then send the write count information to SCM management controller 208 for updating statistics log 600.

TLB engine 214 may be configured to send the write count information to SCM management controller 208 in response to certain events, rather than in a continuous stream, to conserve computing bandwidth. For example, TLB engine 214 may send the write count information when the bucket that stores the write count information is evicted. Moreover, TLB engine 214 may also send the write count information when the write count exceeds a threshold (e.g., a threshold based on the number of bits used to store the write count). After sending the write count information, TLB engine 214 may reset the write count to zero and start the incrementing.

In some embodiments, to improve the efficiency of operation at SCM management controller 208, SCM interface system 144 may maintain a statistics log 600 for storing the write count information transmitted by TLB engine 214. Statistics log 600 may be a first-in-first-out (FIFO) buffer or queue. Statistics log 600 may comprise a head buffer element 602 (associated with a head pointer), followed by a set of buffer elements, and a tail buffer element 604 (associated with a tail pointer). Each buffer element may store data stored in a particular bucket of TLB 212 including a VMID, an SCM block number, and a write count. SCM management controller 208 can acquire bucket data from the buffer element associated with the head pointer, whereas TLB engine 214 may store bucket data at the buffer element associated with the tail pointer. TLB engine 214 may store bucket data at statistics log 600 when, for example, the bucket is selected to be evicted, the write count stored in the bucket exceeds a threshold, etc. The tail pointer can then advance to the next empty buffer element to be written with the data from another bucket of TLB 212. SCM management controller 208 can acquire the VMID, the SCM block number, and the write count information starting from head buffer element 602. After the data stored in head buffer element 602 has been acquired by SCM management controller 208, the head pointer can also advance to the next buffer element. SCM management controller 208 can generate (or update) accumulative write counts in data structure 500 for the SCM blocks based on the write counts obtained from statistics log 600. As discussed above, statistics log 600 may be stored in SCM device 142 such that the write count information in the log do not get lost when, for example, the power to the server is off. SCM management controller 208 can access statistics log 600, as well as data structure 500, via SCM memory controller 206.

After receiving an SCM block number and the associated write count information (e.g., from statistics log 600), SCM management controller 208 can also verify with SCM memory controller 206 that the write operation associated with that SCM block number is successful. For example, after performing a write operation to an SCM block for a virtual machine instance, SCM memory controller 206 may determine whether there is an error in the data stored in the SCM blocks. The determination can be based on ECC stored with the data, or any other error detection mechanism. Upon determining there is no error, or that the error has been corrected (e.g., with ECC), SCM memory controller 206 can transmit a confirmation to SCM management controller 208 that the write operation for that SCM block is successful. Based on the confirmation, SCM management controller 208 can increment the accumulative write count associated with the SCM block and with the VMID in data structure 500. On the other hand, if there is a write failure (e.g., because the data errors are not correctable by ECC), SCM management controller 208 and/or SCM memory controller 206 can also update the write failure entry in data structure 500. SCM memory controller 206 can also update the correctable data error entry in data structure 500 based on a result of the error detection using the ECC.

Figure 7:
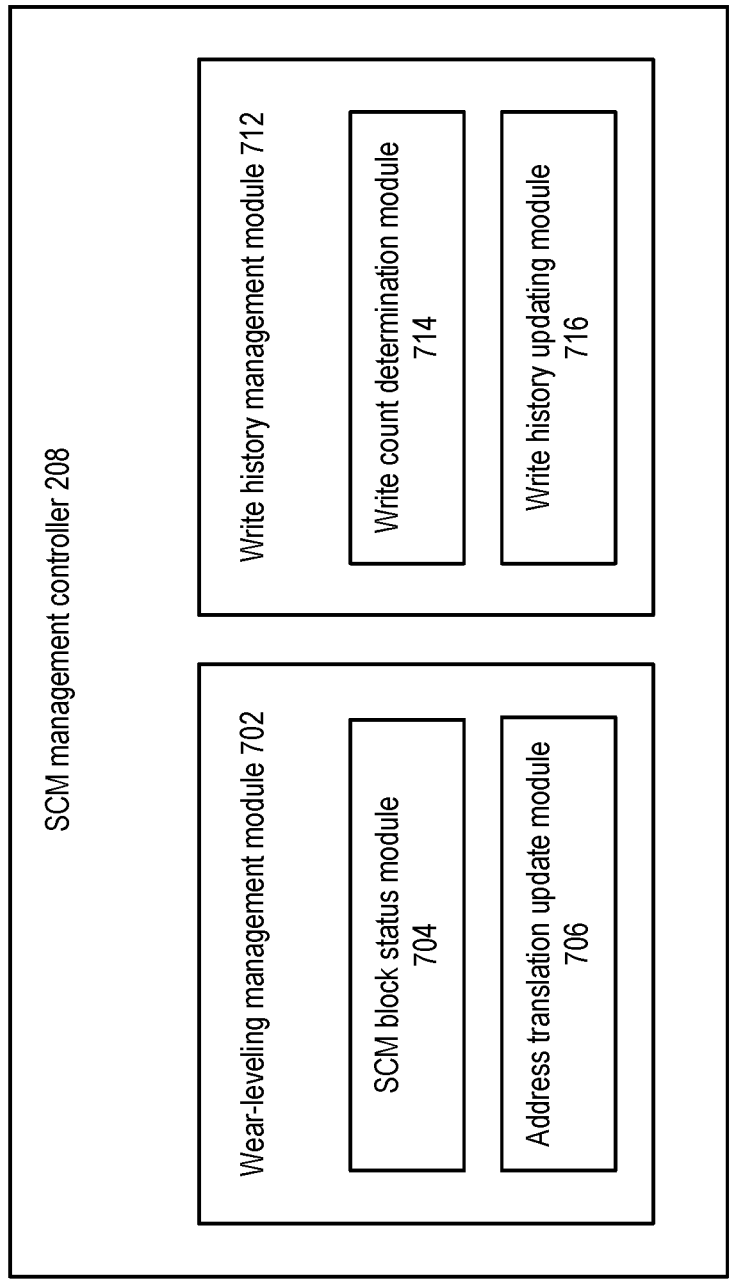
FIG. 7 and FIG. 8 are simplified block diagrams of example sub-components of the example server of FIG. 1, according to certain aspects of the present disclosure.

FIG. 7 illustrates an example of the block diagrams of SCM management controller 208, according to certain aspects of the present disclosure. As shown in FIG. 7, SCM management controller 208 may include a wear-leveling module 702 configured to perform one or more wear-leveling management operations as described above. For example, wear-leveling module 702 may include an SCM block status module 704 and an address translation update module 706 to perform the wear-leveling management operations. For example, SCM block status module 704 may obtain on the accumulative count information, write failure and correctable data error information from data structure 500, and determine a level of wear for at least some of the SCM blocks based on this information. SCM block status module 704 may determine that certain SCM blocks are bad blocks based on, for example, history of write failure, the correctable data error and/or the accumulative count exceeding a threshold, etc. SCM block status module 704 may also rank a set of SCM blocks based on the associated accumulative count. Address translation update module 706 may determine a mapping between the logical addresses and the SCM blocks based on the information provided by SCM block status module 704. For example, address translation update module 706 may map logical addresses associated with the beginning of a logical region to minimally-worn SCM blocks, and map logical addresses associated with the end of the logical region to maximally-worn SCM blocks, as described with respect to FIG. 3B. In addition, wear-leveling management module 702 may also perform other functions, such as interfacing with the hypervisor to obtain logical addresses and VMID for address translation initialization, interfacing with SCM memory controller 206 to perform data migration, etc.

SCM management controller 208 also includes a write history management module 712 to manage the content of data structure 500, as well as the storage of data structure 500. For example, write history management module 712 may include a write count determination module 714 and a write history updating module 716. Write count determination module 714 may obtain a write count, and the associated SCM block number and VMID, from TLB 212 (e.g., via statistics log 600). Write count determination module 714 may also receive a status of the write operation associated with the SCM block number from SCM memory controller 206, to verify that the write operation associated with SCM block number is successful. Based on verifying that the write operation is successful, write count determination module 714 may determine to update the accumulative write count associated with the SCM block number in data structure 500. Write count determination module 714 may also update the write failure entry of the data structure if SCM memory controller 206 indicates that the write operation fails. Moreover, write history updating module 716 manages the updating and storage of data structure 500 in SCM device 142. For example, as part of the wear-leveling policy, write history updating module 716 may receive the level of wear of the SCM blocks from SCM block status module 704, and determine which SCM block to store data structure 500. SCM block status module 704 can then provide the determined SCM block number as well as data representing data structure 500 to SCM memory controller 206, which can perform write operations to SCM device 142 to store data structure 500.

Figure 8:
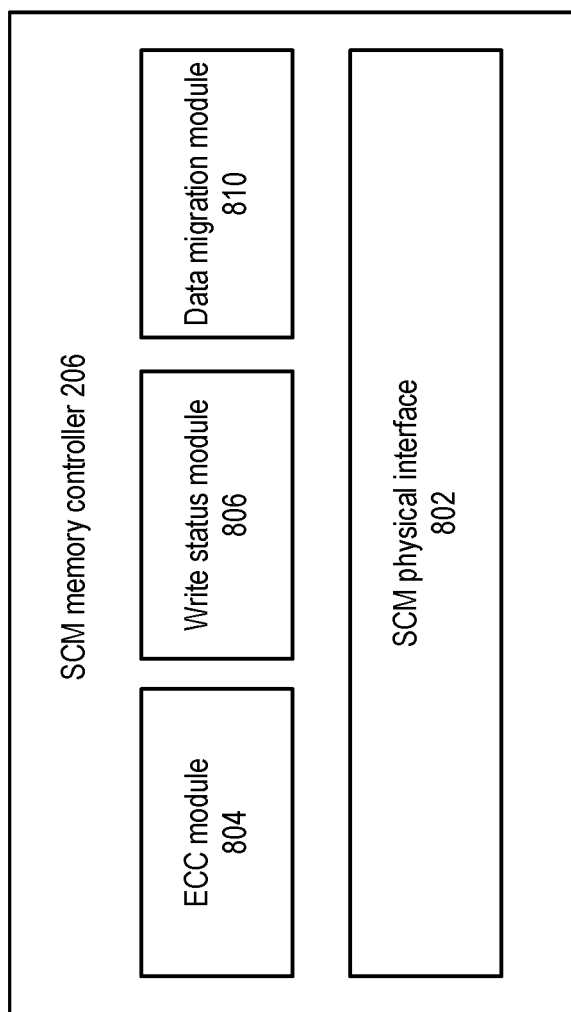

FIG. 8 illustrates an example of the block diagrams of SCM memory controller 206, according to certain aspects of the present disclosure. As shown in FIG. 8, SCM memory controller 206 includes an SCM physical interface 802, an ECC module 804, a write status module 806, and a data migration module 810. SCM physical interface 802 includes circuitries for transmitting signals to SCM device 142, and receiving signals from SCM device 142, to perform read/write operations. The signals may include, for example, physical addresses (e.g., SCM block numbers), control signals indicating read or write, write data, read data, etc. SCM physical interface 802 may include, for example, receiver circuits, transmitter circuits, and logic blocks for controlling the receiver and transmitter circuits. In addition, ECC module 804 and write status module 808 can provide a status of the write operation. For example, ECC module 804 may encode the incoming write data using a pre-determined ECC algorithm (e.g., Reed-Solomon (RS) algorithm) to generate error correction symbols based on pre-determined chunks (e.g., 64 bytes) of the write data, and provide both the write data and the error correction symbols to SCM physical interface 802 for storage at SCM device 142. ECC module 804 can also be instructed to perform error detection based on the error correction symbols after a write operation, or as part of a periodical data scrubbing process, and provide the error detection and correction result to write status module 808. Write status module 808 may provide the write status to SCM management controller 208 for updating accumulative write counts, as described above.

Data migration module 810 may initiate data migration between different blocks of SCM device 142. The data migration can be initiated by SCM management controller 208 as part of the wear-leveling management, or by write status module 806. For example, based on the accumulative write counts information in data structure 500, as well as active indicator 310, SCM management controller 208 may instruct SCM memory controller 206 to move hot data from an SCM block with a relatively large accumulative write count to a target SCM block with a relatively small accumulative write count, and to move cold data from an SCM block with a relatively small accumulative write count to an SCM block with a relatively large accumulative write count. Moreover, in a case where write status module 806 reports a write failure when attempting to perform a write operation to an SCM block, data migration module 810 may also initiate a data migration from that SCM block to a target SCM block, to mitigate the risk of losing the data. The target SCM block information may be provided by SCM management controller 208.

As part of the data migration operation, data migration module 810 may create a copy buffer in local memory 146 as a temporary storage for the migration data. Data migration module 810 may also create a first set of temporary address mappings that maps the source SCM blocks (from which the migration data is retrieved) to the copy buffer, and second set of temporary address mappings that maps the copy buffer to the target SCM blocks. Data migration module 810 can provide the first and second set of address mappings to a memory controller that interfaces with local memory 146. The memory controller can then perform, as part of a DMA operation, transferring of data between the SCM blocks via the copy buffer using the address mappings.

Figure 9:
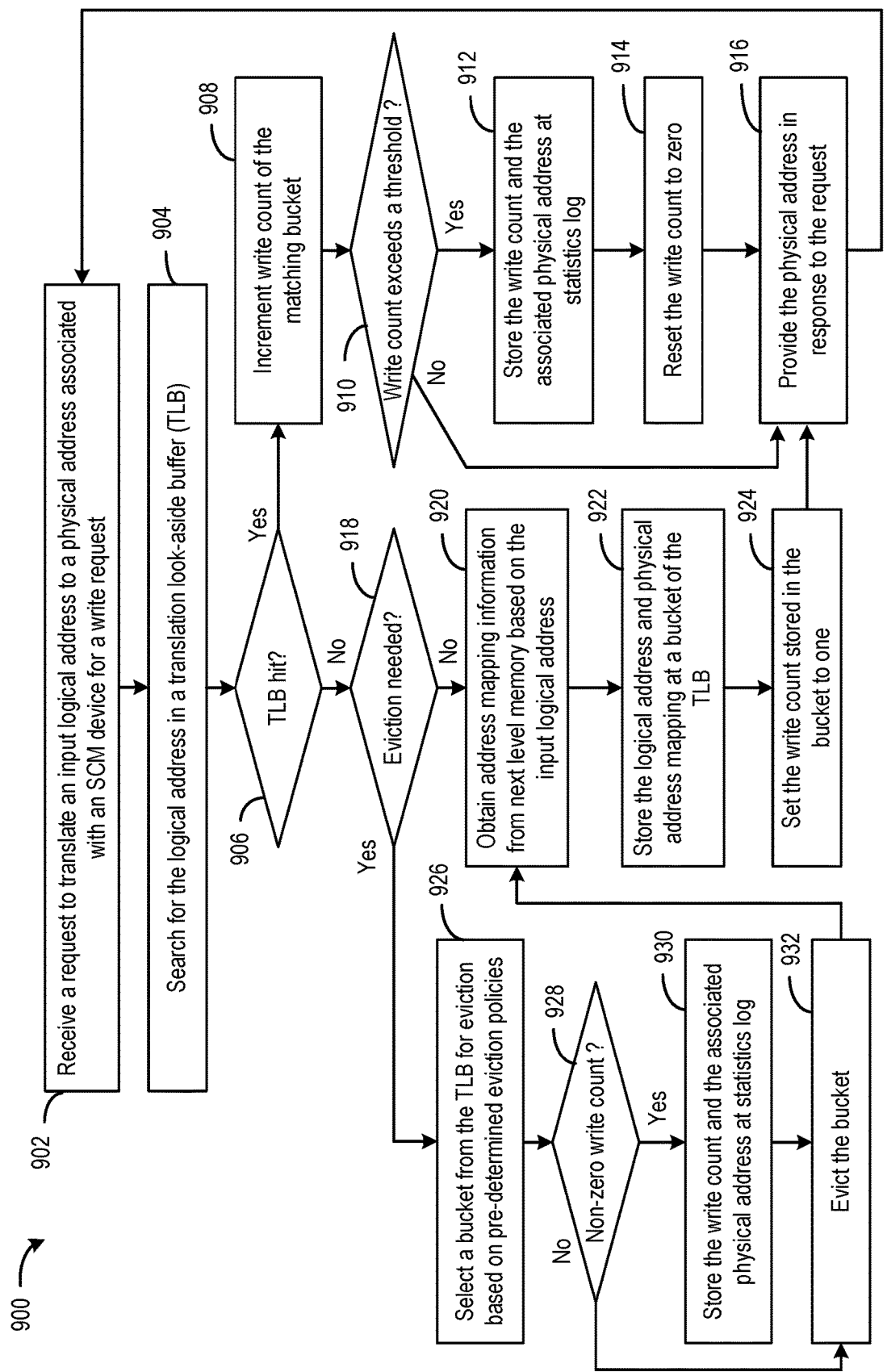
FIG. 9 illustrates an example flow diagram of a process for generating a write operation history for a storage device, according to certain aspects of the present disclosure.

FIG. 9 illustrates an example flow diagram of a process 900 for generating a write operation history for a storage device, according to certain aspects of the present disclosure. The process may be implemented by various systems described above, such as, for example, TLB engine 214 to track a number of write counts for different SCM blocks within SCM device 142. The write counts can be used to generate a history of write history (e.g., in the form of accumulative write counts) for the storage device, based on which a wear-level management operation can be performed on the storage device.

Referring to FIG. 9, at operation 902, the system receives a request to translate a logical address to a physical address associated with an SCM device (e.g., SCM device 142). The request can be based on a write request to write data into SCM device 142 received from interconnect fabric 210. The write request may be, for example, an AXI write request generated by host processor 120.

In operation 904, the system searches for the logical address in a TLB (e.g., TLB 212). The system may first generate an index by applying a hash function to the input logical address and identify an entry associated with the index. The system may then search through all the buckets that stores valid data (e.g., based on valid indicator 420), and for each bucket that stores valid data, the system determines whether the bucket stores a logical address that matches the input logical address. If a bucket with the matching logical address is found, the system may determine that there is a TLB hit, in operation 906. The system then increments the write count (e.g., write count 424) of the matching bucket, in operation 908. The system then determines whether the write count exceeds a threshold, in operation 910. The threshold may be set based on, for example, a fixed number of bits for storing the write count. If the updated write count exceeds the threshold (in operation 910), the system may store the write count and the associated physical address (e.g., SCM block number 412) and VMID (e.g., VMID 422) at, for example, statistics log 600, in operation 912. The system can then reset the write count to zero in operation 914, and then provide the physical address in response to the translation request, in operation 916. On the other hand, if the updated write count does not exceed the threshold (in operation 910), the system may proceed to operation 916 to provide the physical address in response to the translation request. The system can then proceed back to operation 902 to process the next request.

Referring back to operation 906, if a bucket with the matching logical address cannot be found, the system may determine whether a bucket needs to be evicted, in operation 918. The determination can be based on, for example, whether the entry associated with the input logical address contains any bucket with a valid indicator de-asserted. If no eviction is needed (in operation 918), the system may access the next level memory (e.g., local memory 146) to obtain the address mapping information associated with the input logical address, in operation 920. The system then stores the address mapping information including the input logical address and the associated physical address at an empty bucket of TLB 212, in operation 922. The system then sets the write count stored in the bucket to one to reflect the write access request, in operation 924. The system then proceeds back to operation 916 to provide the physical address (stored in operation 922) in response to the translation request, and then proceeds back to operation 902 to process the next translation request.

Referring back to operation 918, if eviction is needed (in operation 918), the system may select a bucket from TLB 212 for eviction based on pre-determined eviction policies and the information stored in the bucket (e.g., lock indicator 414, evictable indicator 416, and LRU 418), in operation 926. For example, as discussed above, a bucket may be selected for eviction if the lock indicator is de-asserted, the evictable indicator is asserted, and LRU includes a value that indicates the bucket is the least recently used within the entry. Before evicting the bucket, the system may also determine whether to transmit the write count in the selected bucket. The determination can be based on, for example, whether the write count is non-zero. The write count can be zero for a bucket if, for example, the SCM block number stored in the bucket has been used for read access but not write access. If the write-count is non-zero (in operation 928), the system may store the write count and the associated physical address (e.g., SCM block number 412) and VMID (e.g., VMID 422) at statistics log 600 in operation 930, and then evict the bucket in operation 932. On the other hand, if the write-count is zero (in operation 928), the system may determine not to transmit the zero write-count to SCM management controller 208 (since the accumulative write count need not be updated), and proceed with evicting the bucket in operation 932. Following the eviction of the bucket, the system may proceed to operation 920 to obtain the address mapping information from local memory 146, and store the address mapping information in the evicted bucket, in operation 922.

Figure 10:
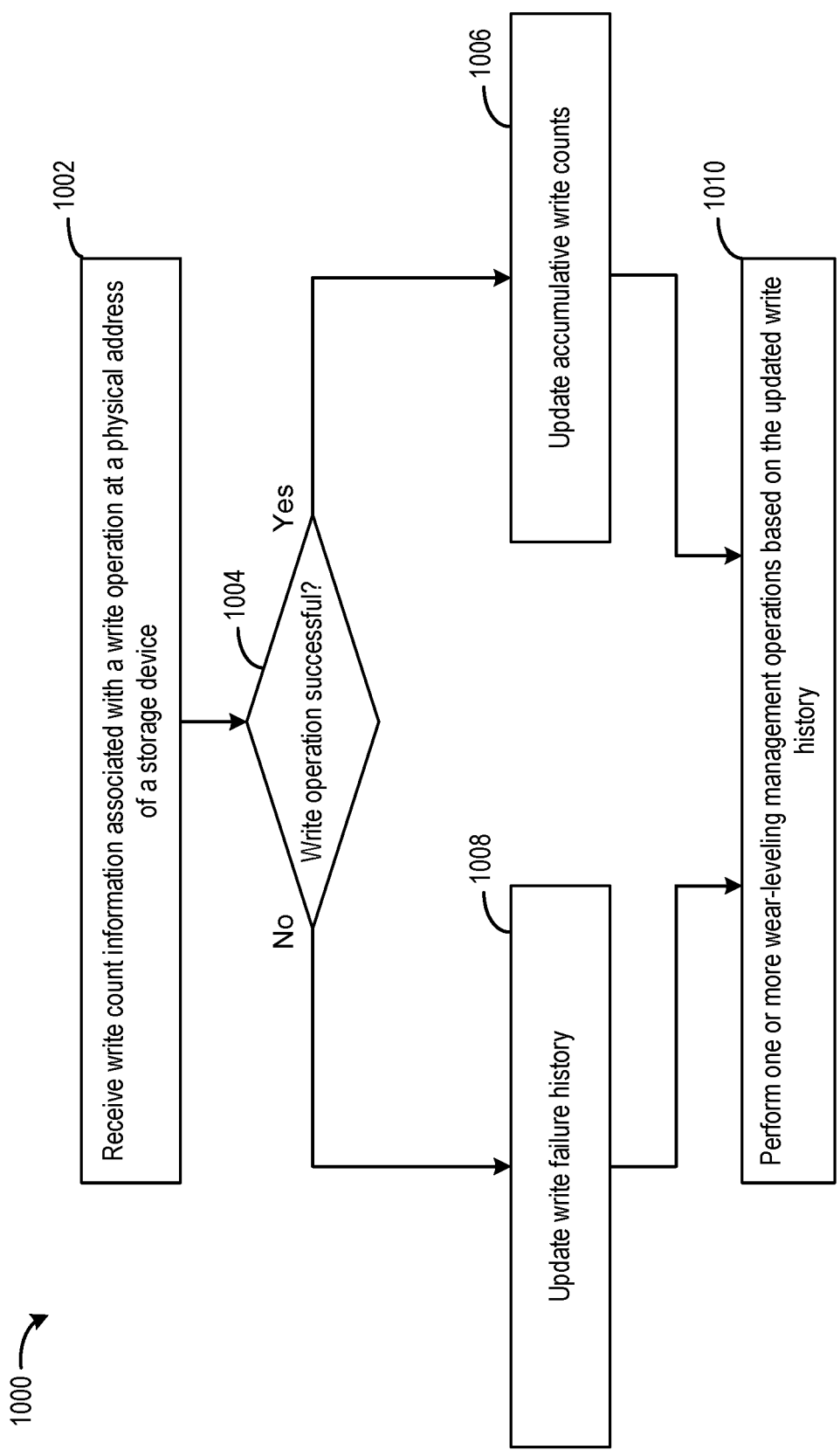
FIG. 10 illustrates an example flow diagram of a process for performing wear-leveling management operation for a storage device, according to certain aspects of the present disclosure.

FIG. 10 illustrates an example flow diagram of a process 1000 for performing a wear-leveling management operation for a storage device, according to certain aspects of the present disclosure. The process may be implemented by various systems described above, such as, for example, SCM management controller 208.

Referring to FIG. 10, in operation 1002, the system receives write count information associated with a write operation at a physical address of a storage device. The physical address of the storage device can include, for example, an SCM block number. The write count information can come from a bucket within TLB 212 that has been evicted, or from a bucket within TLB 212 where the write count exceeds a threshold. The write count information may be obtained together with the SCM block number and a VMID from, for example, head buffer element 602 of statistics log 600.

In operation 1004, the system determines whether the write operation is successful. The determination can be based on a status of the write operation provided by SCM memory controller 206. A write operation is successful if the stored data matches the write data, or error in the stored data (if any) has been fully corrected. If the write operation is successful (in operation 1004), the system may update an accumulative write count associated with the SCM block number (e.g., in data structure 500), in operation 1006. On the other hand, if the write operation fails (in operation 1004), the system may update the write failure history associated with the SCM block number in data structure 500, in operation 1008.

After updating data structure 500, the system may proceed to operation 1010 to perform one or more wear-leveling management operations based on updated data structure 500. The operations may include, for example, determining a set of bad SCM blocks not to be provided to host processor 120, re-ranking the set of SCM blocks to be provided to host processor 120 based on the updated accumulative write counts, updating the mapping between the logical addresses and the SCM block numbers based on the updated ranking (e.g., as described in FIG. 3B), starting a data migration to move data from heavily-worn SCM blocks to lightly-worn SCM blocks, etc., as described above.

It is noted that even though FIGS. 9 and 10 describes an example process as sequential operations, some of the operations may be performed in parallel or concurrently. An operation may have additional steps not included in the figure. Some operations may be optional, and thus may be omitted in various embodiments. Some operations may be performed together with other operations. Furthermore, embodiments of the methods may be implemented in hardware, software, firmware, middleware, microcode, hardware description languages, or any combination thereof.

Figure 11:
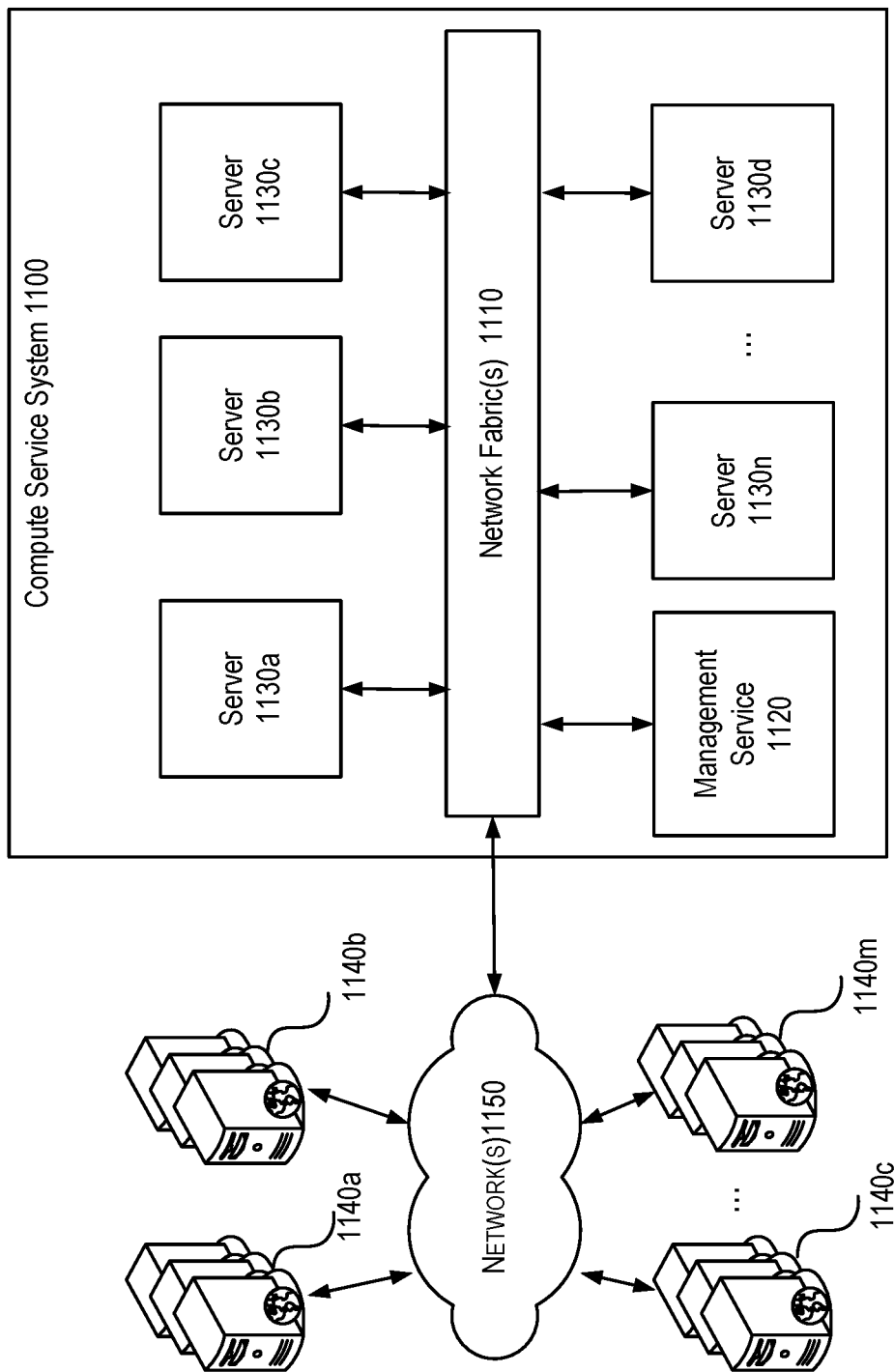
FIG. 11 illustrates an example compute service system in a network-based service environment, according to certain aspects of the present disclosure.

FIG. 11 illustrates an example compute service system 1100 in a network-based service environment that includes embodiments of the present disclosure. In the network-based service environment, one or more clients may utilize client devices 1140*a*-1140*m* (collectively, client devices 1140) to access compute service system 1100 via one or more networks 1150. For example, client devices 1140 may access compute service system 1100 using a web browser, a command line interface, or a web service API. Client devices 1140 may include any appropriate device operable to send and receive requests, messages, or other information over an appropriate network 1150 and convey information back to a client of the device, such as, but not limited to, a mobile phone, a smart phone, a Personal Digital Assistant (PDA), a laptop computer, a desktop computer, a thin-client device, a tablet, an electronic book (e-book) reader, etc.

In some examples, networks 1150 may include any one or a combination of many different types of networks, such as cable networks, the Internet, wireless networks, cellular networks, and other private and/or public networks. Communications over the networks may be enabled by wired or wireless connections and combinations thereof. Networks 1150 may support communications using any of a variety of commercially-available protocols, such as Transmission Control Protocol/Internet Protocol (TCP/IP), Open System Interconnection (OSI), File Transfer Protocol (FTP), Universal Plug and Play (UpnP), Network File System (NFS), Common Internet File System (CIFS), and AppleTalk®.

Compute service system 1100 may include a management service 1120 and a plurality of servers 1130*a*, 1130*b*, 1130*c*, 1130*d*, . . . , and 1130*n* (collectively, servers 1130) in a distributed computing environment. Management service 1120 and servers 1130 may be communicatively coupled to one or more network fabrics 1110, which may be connected to networks 1150 through, for example, high speed network connection, such as InfiniBand, Data Center Ethernet (DCE), gigabit Ethernet, fiber channel, or Fiber Channel over Ethernet (FCoE) etc. Network fabrics 1110 may be any appropriate network, including an intranet, the Internet, a cellular network, a local area network, or any combination thereof. Network fabrics 1110 may support communications using any of a variety of high speed communication protocols.

Servers 1130 may include one or more servers or servers, arranged in a cluster as a server farm, or as individual servers not associated with one another. These servers may be configured to host instances. In some implementations, each server of servers 1130 may have identical or similar hardware resources. In some implementations, servers 1130 may include a plurality of different types of servers that may have different resources and/or configurations. Servers 1130 may include, for example, server 100 of FIG. 1 and/or SCM system 140 to support the hosting of the instances. For example, SCM system 140 may be used to provide data storage for the software applications operating in the hosted instances.

Management service 1120 may be a server or platform that is configured to manage a pool of heterogeneous resources (e.g., servers or specialized hardware resources), provide access to clients and end users, monitor security, and manage resource allocation. For example, management service 1120 may receive requests from client devices 1140 and select one or more servers 1130 to provision the requested instance based on the specific request from the client. In some cases, management service 1120 may allocate a predetermined number of resources to a client who may pay a flat fee or a monthly fee. In some cases, for a client that is charged on a pay-per-use basis, management service 1120 may allocate resources to the client when the client needs them and decommission them when they are no longer needed, such that the resources can be allocated to other clients. Management service 1120 may include a network interface for communication with network fabrics 1110, a database for storing configurations and status of servers 1130 connected to network fabrics 1110, and a processing logic for selecting one or more available servers for an instance and performing other management functions.

As described above, client devices 1140 may request different types of instances (e.g., virtual machines or servers) from compute service system 1100. For example, in some cases, a client may request an instance to perform complex computational workloads, such as batch processing, distributed analytics, high performance scientific or engineering applications, gaming, or video-encoding. In some cases, a client may request an instance for applications sensitive to network performance.

In some cases, a client may request a specific system hardware configuration. For example, the client may specify the number of processor cores, the size of the memory, the size of a storage device, and/or the operating system or Virtual Machine Monitor (WM, i.e., hypervisor) needed for the applications. In some cases, the client may select a type of instance from multiple types of instances offered by the compute service system. For example, a computing service provider may offer different types or families of instances based on compute, memory, and storage capabilities, where different types of instances may provide different capabilities on computing performance, I/O performance, memory size and performance, storage size and performance, network performance, and graphic processing performance. And, in some cases, the client may request a particular operating system or hypervisor to run on the server, such as Microsoft Windows®, Linux®, Microsoft Hyper-V®, Xen®, or VMware vSphere®. In some cases, the client may request a specific type of hardware, such as GPUs or SSDs. As such, in embodiments of the present disclosure the compute service provider may offer one or more "baremetal" instance types. The bare-metal instance types can have differing combinations of hardware.

In some cases, a client's workloads and applications may demand higher performance than the virtualization layer allows, or the client may want to use a different virtualization system on hardware managed by the compute service provider. The client may rent a server as a bare-metal instance and use its own operating system on the server, in order to remove the hypervisor and the performance impact caused by virtualization. The hardware of the bare-metal instance may be fully dedicated to the client, including any additional storage, during the time period that the sever is rented to the client.

In response to network service requests for a bare-metal instance from a client, management service 1120 may select one or more servers to allocate to the client. For example, in implementations where the servers may have different hardware resources, management service 1120 may select a server that best matches the requirement of the client-requested instance with minimum extra resources. In implementations where all servers have the same or similar hardware resources, management service 1120 may randomly select any available server, or a cluster of available servers that are closely located. In some implementations, management service 1120 may select a server that is capable of provisioning a bare-metal instance.

Figure 12:
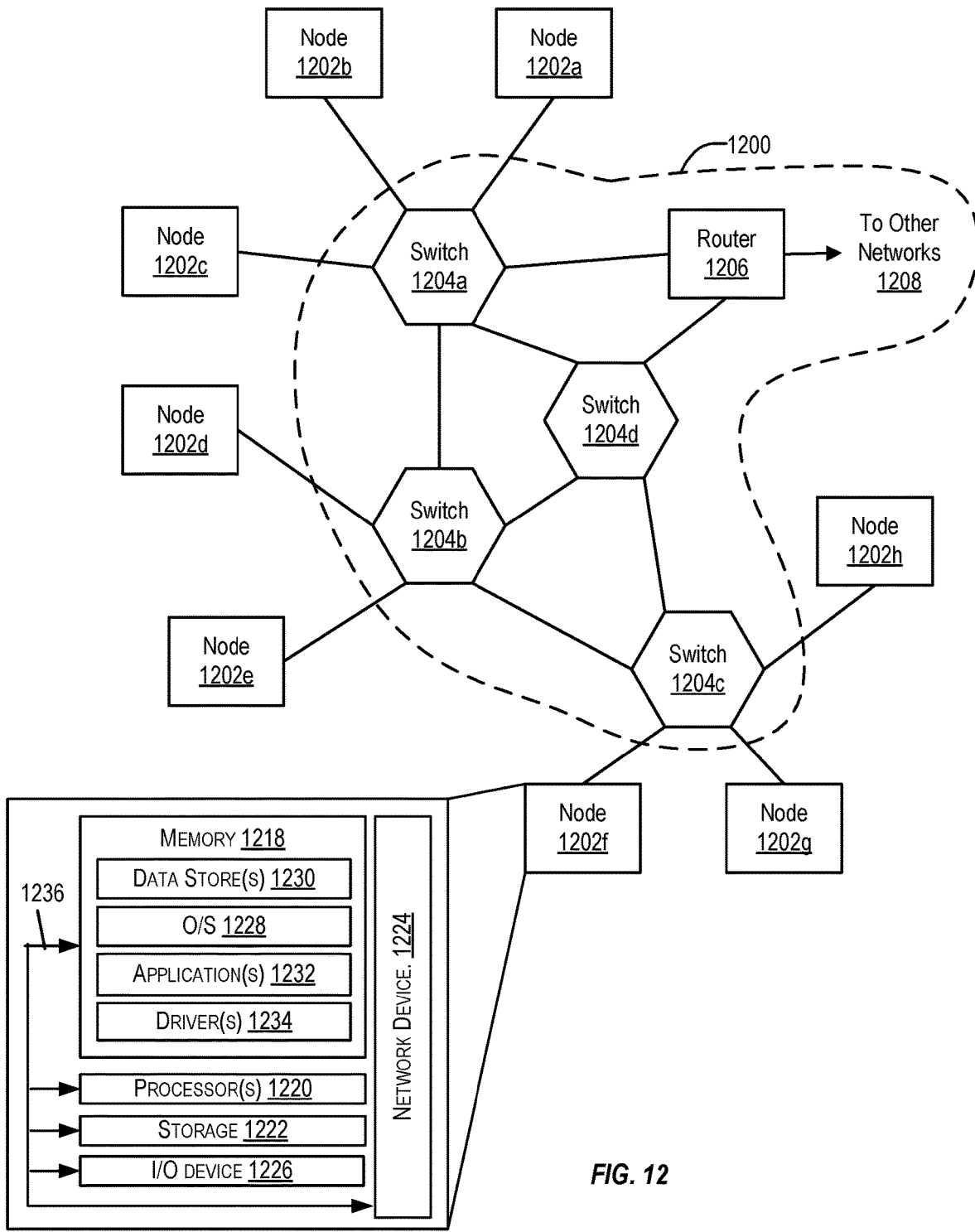
FIG. 12 illustrates an example architecture for features and systems described herein that includes one or more service provider computers and/or a user device connected via one or more networks, according to certain aspects of the disclosure.

FIG. 12 illustrates a network 1200, illustrating various different types of network devices, such as nodes comprising the network device, switches and routers. In certain embodiments, the network 1200 may be based on a switched architecture with point-to-point links. As illustrated in FIG. 12, the network 1200 includes a plurality of switches 1204a-1204d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 1204a-1204d may be connected to a plurality of nodes 1202a-1202h and provide multiple paths between any two nodes.

The network 1200 may also include one or more network devices for connection with other networks 1208, such as other subnets, LANs, wide area networks (WANs), or the Internet, and may be referred to as routers 1206. Routers use headers and forwarding tables to determine the best path for forwarding the packets, and use protocols such as internet control message protocol (ICMP) to communicate with each other and configure the best route between any two devices.

In some examples, network(s) 1200 may include any one or a combination of many different types of networks, such as cable networks, the Internet, wireless networks, cellular networks and other private and/or public networks. Interconnected switches 1204a-1204d and router 1206, if present, may be referred to as a switch fabric, a fabric, a network fabric, or simply a network. In the context of a computer network, terms "fabric" and "network" may be used interchangeably herein.

Nodes 1202a-1202h may be any combination of host systems, processor nodes, storage subsystems, and I/O chassis that represent user devices, service provider computers or third party computers.

User devices may include computing devices to access an application 1232 (e.g., a web browser or mobile device application). In some aspects, the application 1232 may be hosted, managed, and/or provided by a computing resources service or service provider. The application 1232 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1208. Additionally, the user device(s) may be part of the distributed system managed by, controlled by, or otherwise part of the service provider computer(s) (e.g., a console device integrated with the service provider computers). One example of application 1232 can include, for example, software instructions corresponding a hypervisor, a virtual machine instance, etc. operating on host processor 120 of FIG. 1.

The node(s) of FIG. 12 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1232 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1202a-1202h may include at least one memory 1218 and one or more processing units (or processor(s) 1220). The processor(s) 1220 may be implemented in hardware, computer-executable instructions, firmware, or combinations thereof. Computer-executable instruction or firmware implementations of the processor(s) 1220 may include computer-executable or machine-executable instructions written in any suitable programming language to perform the various functions described.

In some instances, the hardware processor(s) 1220 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared. Hardware processor(s) 1220 may include, for example, host processor 120 of FIG. 1.

The memory 1218 may store program instructions that are loadable and executable on the processor(s) 1220, as well as data generated during the execution of these programs. Depending on the configuration and type of the node(s) 1202a-1202h, the memory 1218 may be volatile (such as RAM) and/or non-volatile (such as ROM, flash memory, etc.). The memory 1218 may include an operating system 1228, one or more data stores 1230, one or more application programs 1232, one or more drivers 1234, and/or services for implementing the features disclosed herein.

The operating system 1228 may support nodes 1202a-1202h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix®, Linux®, Windows®, macOS®, iOS®, Android™ and the like. The operating system 1228 may also be a proprietary operating system.

The data stores 1230 may include permanent or transitory data used and/or operated on by the operating system 1228, application programs 1232, or drivers 1234. Examples of such data include web pages, video data, audio data, images, user data, and so on. The information in the data stores 1230 may, in some implementations, be provided over the other network(s) 1208 to user devices 1204. In some cases, the data stores 1230 may additionally or alternatively include stored application programs and/or drivers. Alternatively or additionally, the data stores 1230 may store standard and/or proprietary software libraries, and/or standard and/or proprietary application user interface (API) libraries. Information stored in the data stores 1230 may be machine-readable object code, source code, interpreted code, or intermediate code.

The drivers 1234 include programs that may provide communication between components in a node. For example, some drivers 1234 may provide communication between the operating system 1228 and additional storage 1222, network device 1224, and/or I/O device 1226. Alternatively or additionally, some drivers 1234 may provide communication between application programs 1232 and the operating system 1228, and/or application programs 1232 and peripheral devices accessible to the service provider computer. In many cases, the drivers 1234 may include drivers that provide well-understood functionality (e.g., printer drivers, display drivers, hard disk drivers, Solid State Device drivers). In other cases, the drivers 1234 may provide proprietary or specialized functionality.

The service provider computer(s) or servers may also include additional storage 1222, which may include removable storage and/or non-removable storage. The additional storage 1222 may include magnetic storage, optical disks, solid state disks, flash memory, and/or tape storage, as well as SCM system 140 of FIG. 1. The additional storage 1222 may be housed in the same chassis as the node(s) 1202a-1202h or may be in an external enclosure. The memory 1218 and/or additional storage 1222 and their associated computer-readable media may provide non-volatile storage of computer-readable instructions, data structures, program modules, and other data for the computing devices. In some implementations, the memory 1218 may include multiple different types of memory, such as SRAM, DRAM, or ROM.

The memory 1218 and the additional storage 1222, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1218 and the additional storage 1222 are examples of computer storage media. Additional types of computer storage media that may be present in the node(s) 1202a-1202h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1202a-1202h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1202a-1202h may also include I/O device(s) 1226, such as a keyboard, a mouse, a pen, a voice input device, a touch input device, a display, speakers, a printer, and the like. The node(s) 1202a-1202h may also include one or more communication channels 1236. A communication channel 936 may provide a medium over which the various components of the node(s) 1202a-1202h can communicate. The communication channel or channels 1236 may take the form of a bus, a ring, a switching fabric, or a network.

The node(s) 1202a-1202h may also contain network device(s) 1224 that allow the node(s) 1202a-1202h to communicate with a stored database, another computing device or server, user terminals and/or other devices on the network(s) 1200. In some embodiments network device(s) 1224 may be part of SCM system 140 of FIG. 1 (e.g., SCM interface system 144) to provide access to SCM device 142.

In some implementations, the network device 1224 is a peripheral device, such as a PCI-based device. In these implementations, the network device 1224 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the network device 1224 may be connected to a computing system using a PCIe interface for implementing NVMe.

A PCI-based device may include one or more functions. A "function" describes operations that may be provided by the network device 1224. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1224 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 12, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit, comprising:
   a cache device configured to store:
      a first mapping between logical addresses and physical addresses of a first memory, the first mapping being a subset of mapping between logical addresses and physical addresses of the first memory stored in a second memory; and
      an access count associated with each of the physical addresses of the first mapping; and
   a management controller configured to:
      maintain access statistics of the first memory based on the access counts stored in the cache device; and
      determine the mapping between logical addresses and physical addresses stored in the second memory based on the access statistics and predicted likelihoods of at least some of the logical addresses receiving an access operation, wherein the access operation includes a write operation, the access statistics include an accumulative write count for at least some of the physical addresses of the first memory, and the management controller is configured to map a first logical address to a first physical address and a second logical address to a second physical address based on the first logical address being determined to have a higher predicted likelihood of receiving a write operation than the second logical address, the first physical address having a lower accumulative write count than the second physical address.

2. The integrated circuit of claim 1, wherein the management controller is configured to determine that the first logical address has a higher predicted likelihood of receiving a write operation than the second logical address based on the first logical address being at a beginning of a logical address range of a logical region and the second logical address being at an end of the logical address range.

3. The integrated circuit of claim 1, wherein the cache device comprises a plurality of entries, each entry of the plurality of entries configured to store a logical address and a physical address of the first mapping, and an access count of the physical address; and
wherein the cache device is configured to update the access count of an entry based on receiving a request to access the entry to translate the logical address of the entry.

4. The integrated circuit of claim 3, wherein the management controller is configured to update the access statistics of a physical address based on the access count of an entry of the cache device that stores the physical address exceeds a threshold.

5. The integrated circuit of claim 4, wherein the cache device is configured to, after the management controller updates the access statistics of the physical address, reset the access count of the entry that stores the physical address to zero.

6. The integrated circuit of claim 3, wherein each entry is configured to store one or more eviction parameters;
wherein the cache device is configured to, based on the one or more eviction parameters of the entry, evict an entry of the plurality of entries when the cache device is full and a request to translate a logical address not found in the cache device is received; and
wherein the management controller is configured to update the access statistics of the physical address of the evicted entry.

7. The integrated circuit of claim 6, wherein the management controller is configured to update the access statistics of the physical address of the evicted entry based on the access count of the evicted entry being non-zero.

8. The integrated circuit of claim 6, wherein the one or more eviction parameters of an entry includes a flag indicating whether the entry is evictable; and
wherein the cache device is configured to select an entry for eviction based on the flag indicating that the selected entry is evictable.

9. The integrated circuit of claim 6, wherein the one or more eviction parameters of an entry includes an indication of how recent the entry was accessed in response to the request; and
wherein the cache device is configured to select an entry for eviction based on the indication indicating that the selected entry is the least recently accessed among the plurality of entries.

10. The integrated circuit of claim 6, wherein the one or more eviction parameters of an entry includes an identifier of a virtual machine; and
wherein the cache device is configured to select an entry for eviction based on the identifier of the virtual machine of the selected entry and at least one of: the virtual machine having been disabled, or a cache management policy for the virtual machine.

11. The integrated circuit of claim 1, wherein the cache device is configured to fetch an access count of a physical address to a buffer based on at least one of: an entry of the cache device that stores the physical address being evicted, or the access count exceeding a threshold; and
wherein the management controller is configured to obtain the access count from the buffer and to update the access statistics based on the access count obtained from the buffer.

12. The integrated circuit of claim 1, wherein the first memory includes a storage class memory (SCM) device; and
wherein the physical addresses comprise SCM block numbers.

13. The integrated circuit of claim 1, wherein the cache device comprises a translation look-side buffer (TLB).

14. The integrated circuit of claim 1, wherein the access statistics are stored in the first memory.

15. A method comprising:
storing, at a cache device, a first mapping between logical addresses and physical addresses of a first memory and an access count associated with each of the physical addresses of the first mapping, the first mapping being a subset of mapping between logical addresses and physical addresses of the first memory stored in a second memory;
maintaining access statistics of the first memory based on the access counts stored in the cache device; and
determining the mapping between logical addresses and physical addresses stored in the second memory based on the access statistics and predicted likelihoods of at least some of the logical addresses receiving an access operation,
wherein the access operation includes a write operation, the access statistics include an accumulative write count for at least some of the physical addresses of the first memory, and a first logical address is mapped to a first physical address and a second logical address is mapped to a second physical address based on the first logical address being determined to have a higher predicted likelihood of receiving a write operation than the second logical address, the first physical address having a lower accumulative write count than the second physical address.

16. The method of claim 15, further comprising:
determining that the first logical address has a higher predicted likelihood of receiving a write operation than the second logical address based on the first logical address being at a beginning of a logical address range of a logical region and the second logical address being at an end of the logical address range.

17. The method of claim 15, further comprising:
fetching, from the cache device, an access count of a physical address to a buffer based on at least one of: an entry of the cache device that stores the physical address being evicted, or the access count exceeding a threshold;
obtaining, from the buffer, the access count; and
updating the access statistics based on the access count obtained from the buffer.

18. The method of claim 15, wherein the first memory includes a storage class memory (SCM) device; and
wherein the physical addresses comprise SCM block numbers.

* * * * *